Figure 2:
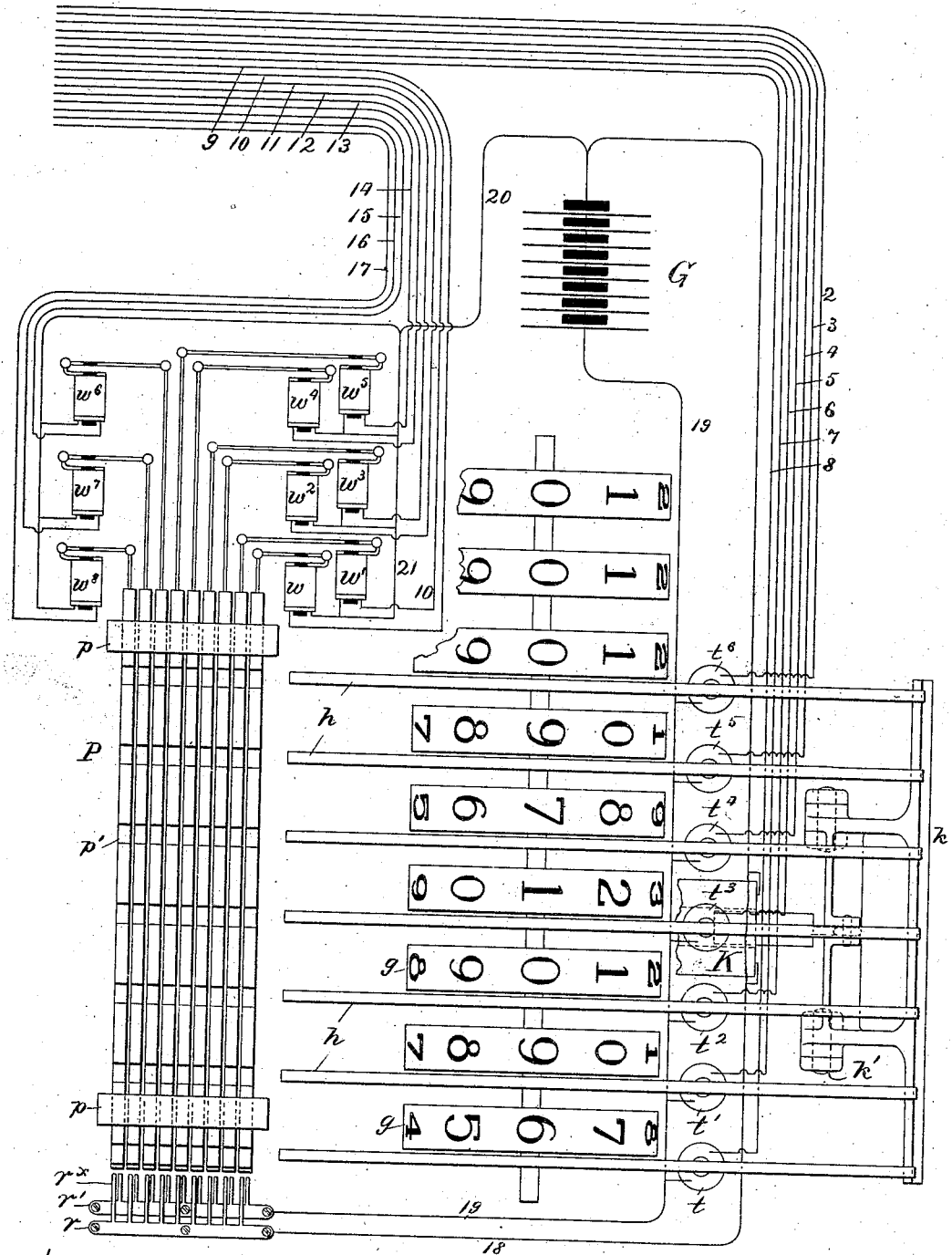

A. H. ELLIS.
ADDING MACHINE, &c.
APPLICATION FILED NOV. 1, 1899.
996,402.
Patented June 27, 1911.
6 SHEETS—SHEET 1.
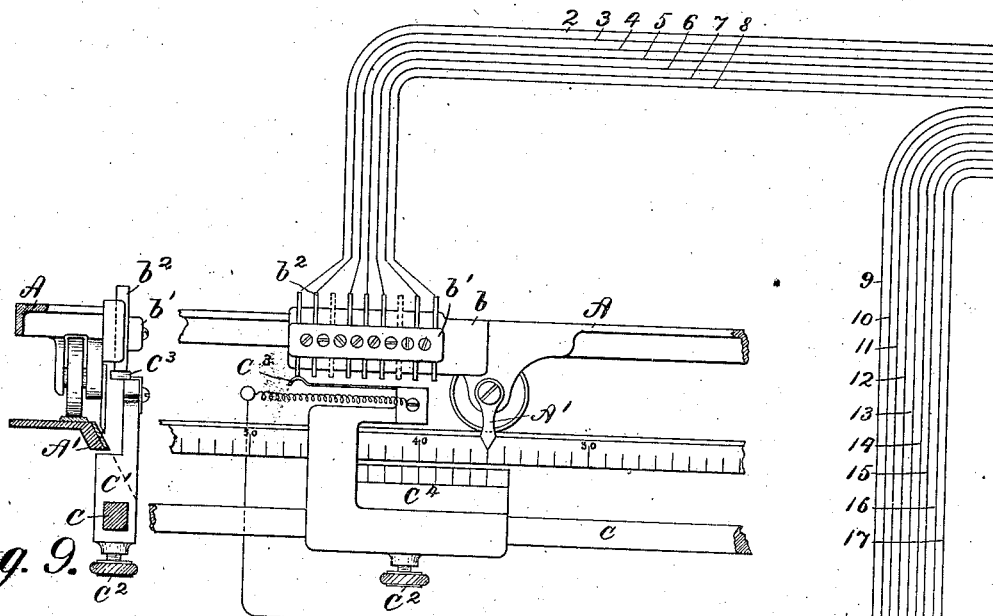
Fig. 9.
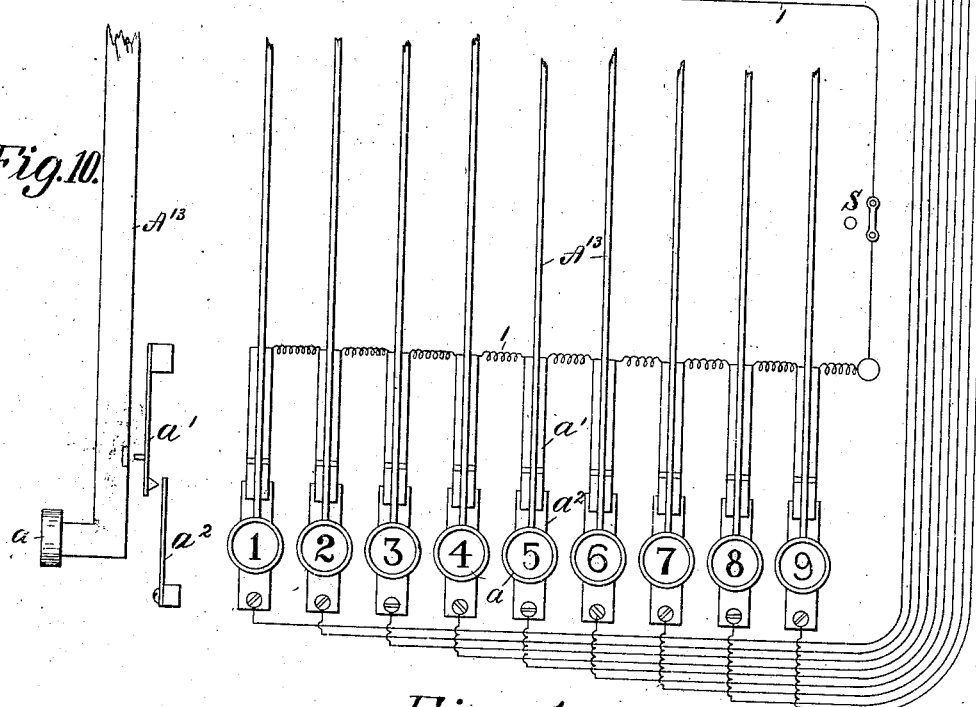
Fig. 10.
Fig. 1.
WITNESSES
B. C. Stickney
Paul Gabrielson
INVENTOR
Albert H. Ellis
by Jacob Felbel
HIS ATTORNEY.

A. H. ELLIS.
ADDING MACHINE, &c.
APPLICATION FILED NOV. 1, 1899.

996,402.

Patented June 27, 1911.
6 SHEETS—SHEET 3.

WITNESSES
P. C. Stickney
Carl Gabrielson

INVENTOR
Albert H. Ellis
by Jacob Felbel
HIS ATTORNEY.

A. H. ELLIS.
ADDING MACHINE, &c.
APPLICATION FILED NOV. 1, 1899.

996,402.

Patented June 27, 1911.

6 SHEETS—SHEET 4.

WITNESSES:
B. C. Stickney
Carl Gabrielson

INVENTOR
Albert H. Ellis
by Jacob Felbel
HIS ATTORNEY.

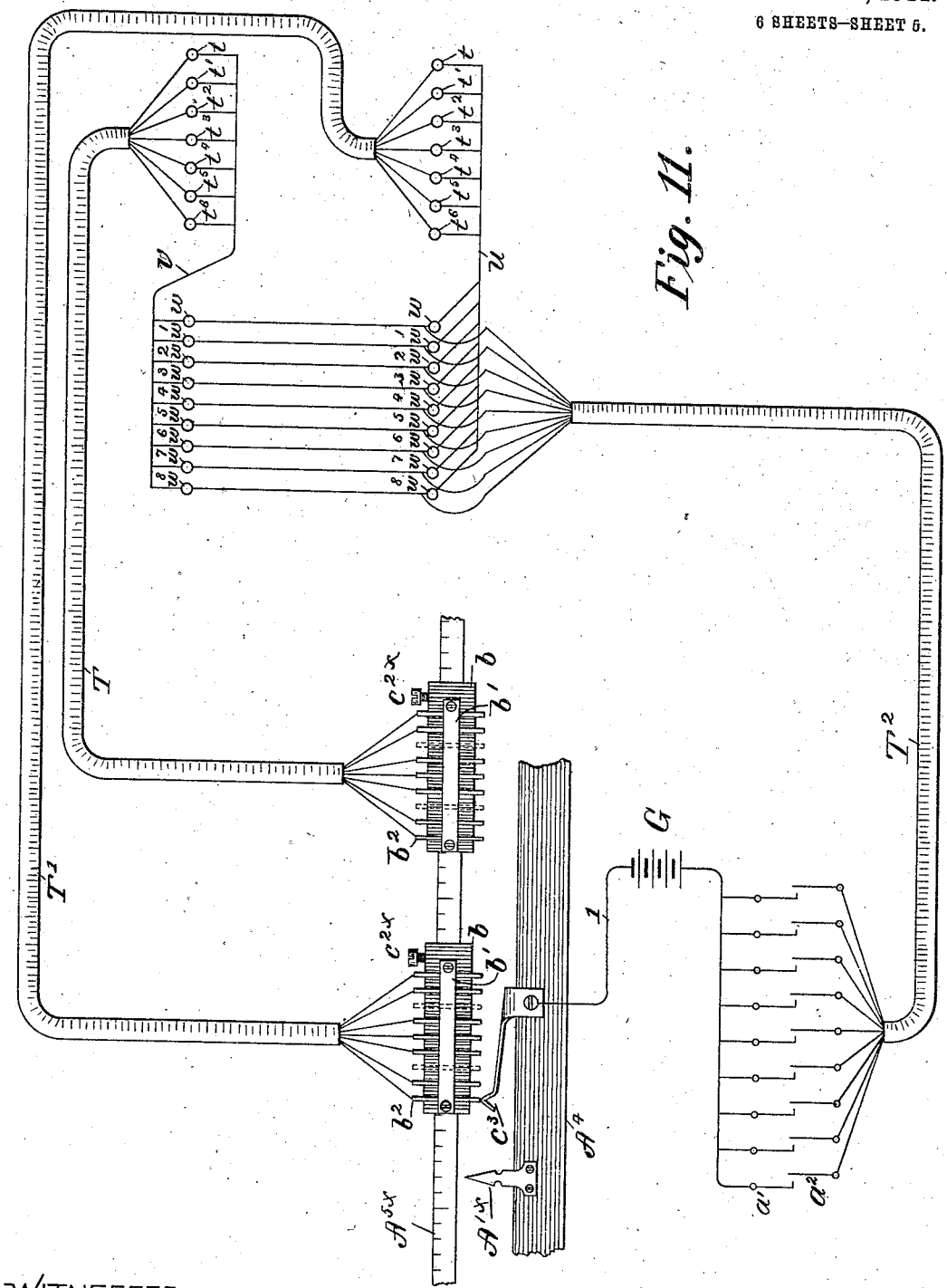

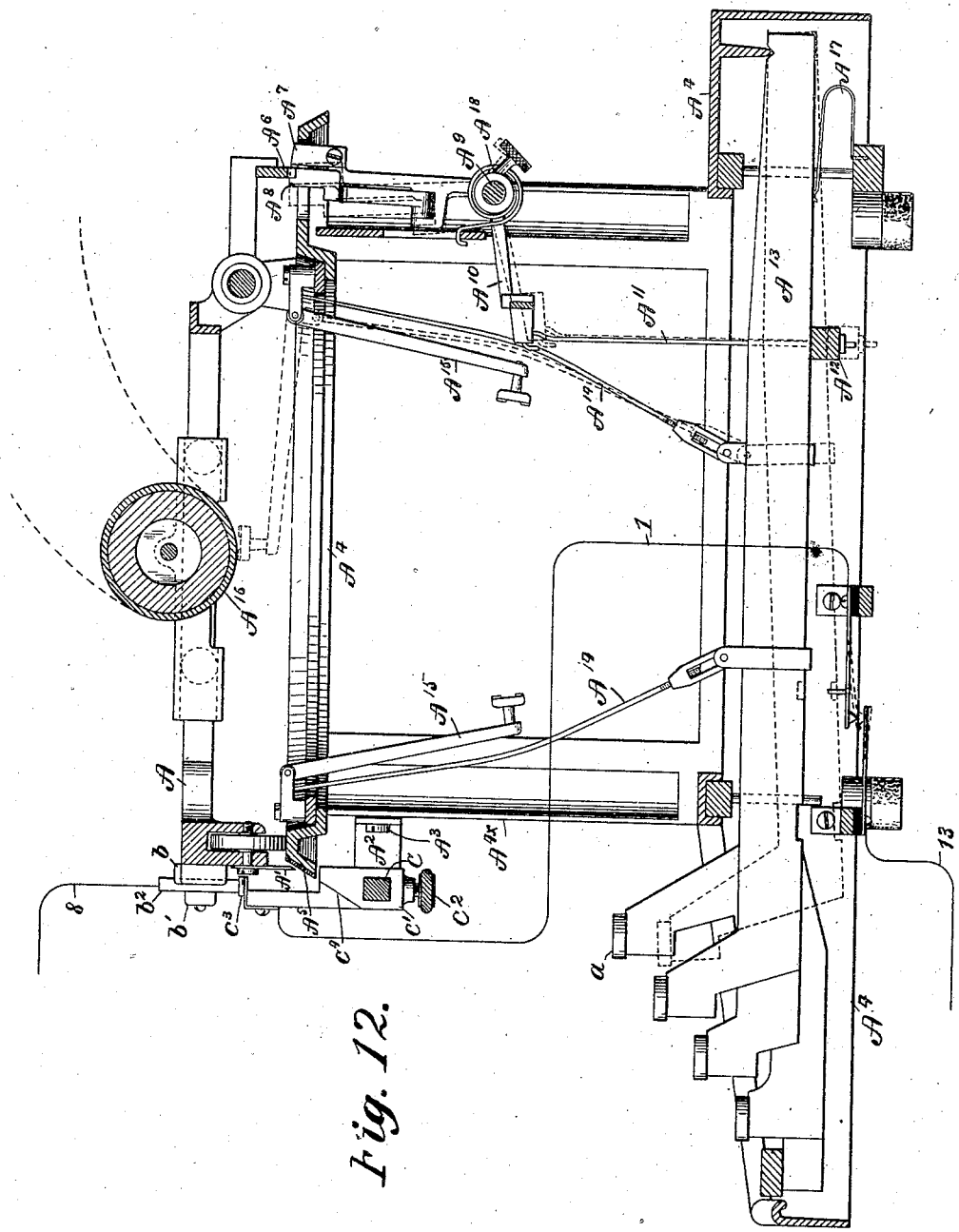

UNITED STATES PATENT OFFICE.

ALBERT H. ELLIS, OF NEW YORK, N. Y., ASSIGNOR TO WYCKOFF, SEAMANS & BENEDICT, OF ILION, NEW YORK, A CORPORATION OF NEW YORK.

ADDING-MACHINE, &c.

996,402.  Specification of Letters Patent.  Patented June 27, 1911.

Application filed November 1, 1899. Serial No. 735,449.

*To all whom it may concern:*

Be it known that I, ALBERT H. ELLIS, a citizen of the United States, and resident of the borough of Manhattan, in the city of New York, in the county of New York and State of New York, have invented certain new and useful Improvements in Adding-Machines, &c., of which the following is a specification.

This invention relates to adding machines, and its specific or immediate object is to provide a simple adding mechanism which may be attached to an ordinary typewriter without difficulty, and which in its operation entails no more work upon the part of the operator than is required in the ordinary process of writing. If desired, the invention as a whole or in part may be embodied in combined listing and adding machines, which correspond to ordinary typewriters with the exception that the letter types and keys are omitted and the adding mechanism is connected to figure keys only, whereby the respective amounts given upon bank checks may be written in list form and automatically added. Or if desired, many of the broad and specific features of the invention may be embodied in mere adding machines, where no types are used. Hence my invention is adapted for either a combined typewriting and adding machine, or a combined listing and adding machine, or merely an adding machine. In seeking to attain the specific objects of my invention, I have provided electric connections between the writing mechanism and the adding mechanism, but many features of construction will also be found useful in cases where the writing mechanism is mechanically connected to the adding mechanism. Moreover in pursuing said object I have devised many contrivances and combinations, mechanical as well as electrical, which will be found useful in machines whose construction varies from mine in other respects.

Typewriting machines are usually provided with a series of keys, each of which is connected to one or more types in such a manner that the depression of any key causes its appropriate type to strike against the paper. These types are sometimes mounted on type bars and sometimes on a wheel or in other ways. In those instances in which my invention is applied to a typewriting machine, it is immaterial in what manner the types are connected to the keys. Typewriting machines also usually have some part which moves step-by-step as the several keys are actuated in order to cause the types to strike the paper one after another a suitable distance apart. In some typewriting machines a paper carriage has this step-by-step movement and in others, as in most book typewriters, the paper is stationary and the type action travels over the paper. Whatever part of the machine it is that has this step-by-step motion, I shall call the carriage. In the present instance I have shown my invention applied to a Remington typewriter in which the types are mounted on pivoted type bars and in which the paper carriage is movable step-by-step.

The adding attachment may be, and preferably is, entirely disconnected mechanically from the writing machine, but since it operates electrically, it is connected with the machine by electric conductors, which may be flexible or rigid as desirable. The only apparatus necessary for direct attachment to the typewriter, is such as is required for completing the electric circuits, and this is extremely simple.

In making out bills, waybills, manifests, statements, or records of any character containing columns of figures to be added, when a numeral is printed in either the units, tens, hundreds or other column, the said numeral will be automatically added as units, tens, hundreds, etc., according to the column in which the numeral is printed, so that the total will show upon the face of the adding machine, and may be copied therefrom at the foot of the column.

In carrying out my invention I prefer to use the ordinary figure keys of the typewriter keyboard, and to provide for printing with these keys on all portions of a line or page, except the column or columns to be added, without affecting the adding mechanism; but as soon as the paper is struck by the figure types in a figure column, the adding mechanism operates. For this purpose two sets of circuit controllers on the typewriter are used; that is to say, each circuit connecting the typewriter with the adding mechanism contains two circuit controllers in series with each other. One set of circuit controllers is controlled by the keys, while the other set is made operative or inoperative by the position of the paper-carriage or other part of the typewriter making step-by-step movements. The operation of any one of the circuit controllers will not affect the adding machine, but both operated simultaneously will cause it to perform its functions.

Figure 3:
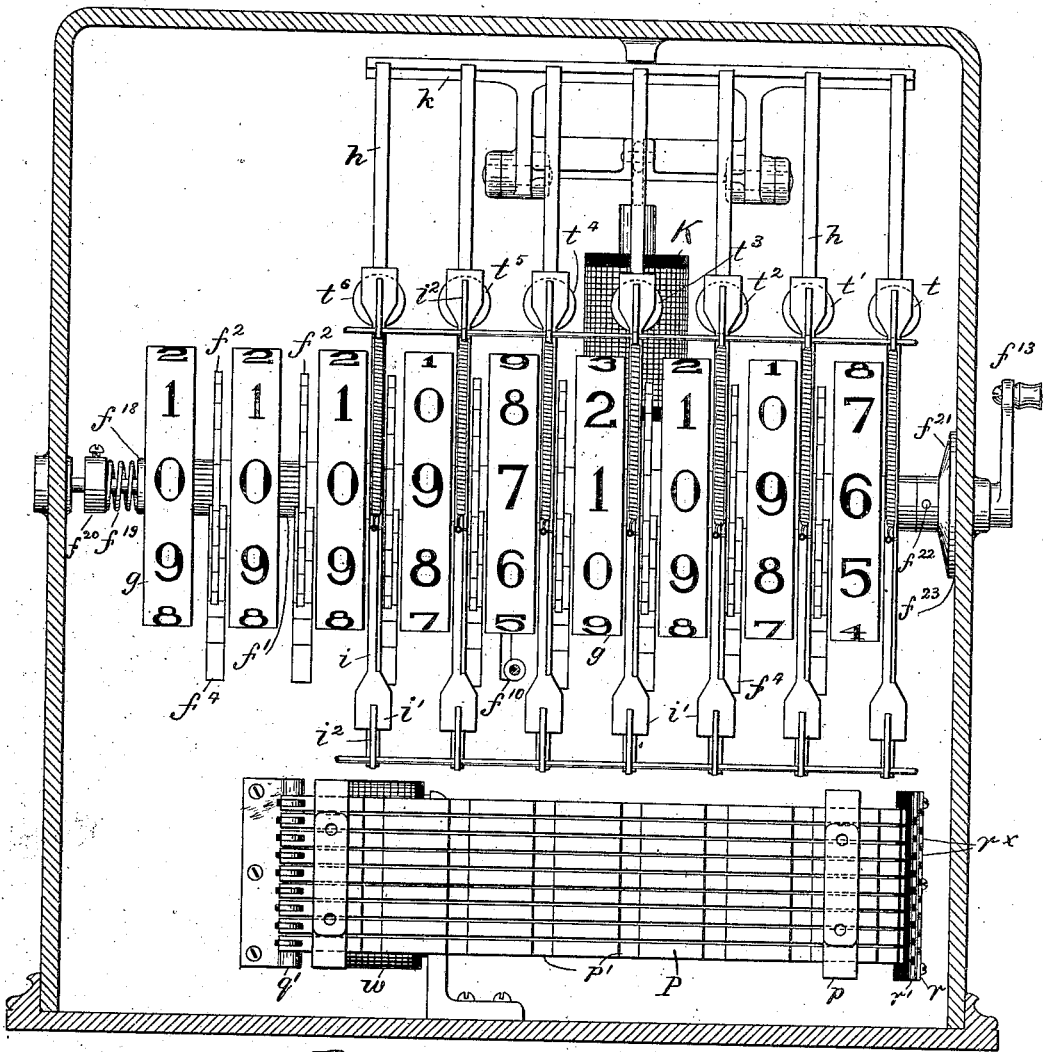
Figure 8:
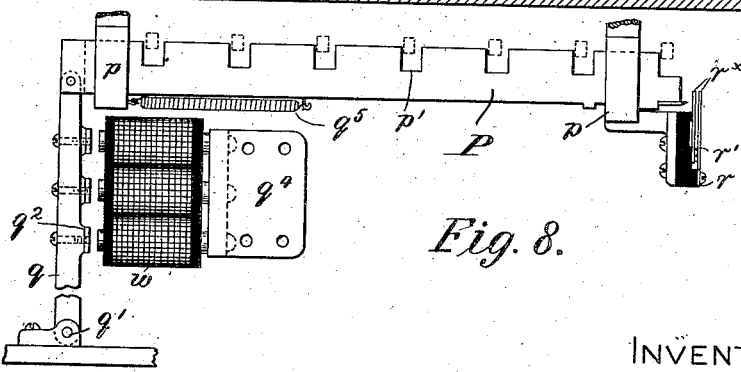
Figures 4, 5, 6:
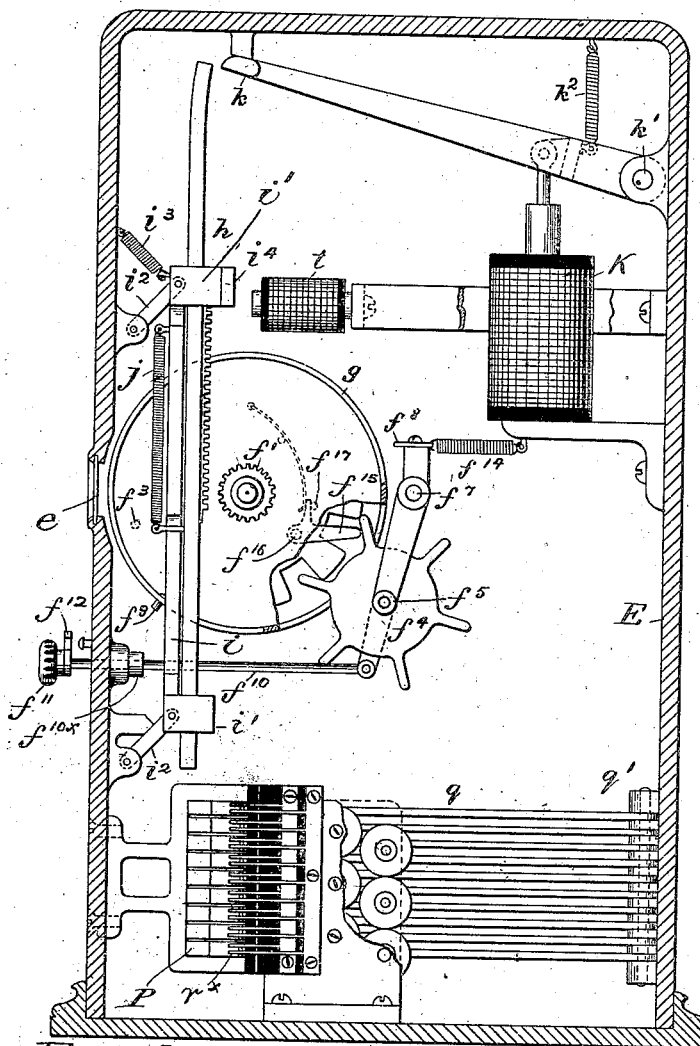
Figure 7:
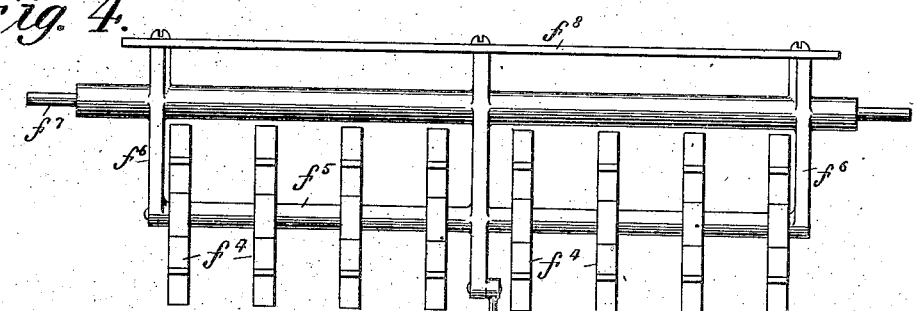

The invention will be described in detail with reference to the accompanying drawings, in which, Figure 1 is a conventional representation of the apparatus and circuits forming a part of or directly connected with a typewriting machine, in accordance with my invention. Fig. 2 is a similar representation of the adding mechanism, and is to be read in connection with Fig. 1. Fig. 3 is a front elevation of the adding machine, the casing being in section. Fig. 4 is an end elevation of the same with parts broken away. Fig. 5 is a front elevation of the adding machine on a reduced scale. Fig. 6 is a section through a portion of the main shaft of the adding machine and its countershaft. Fig. 7 is a front elevation of the countershaft of the adding machine and its connections. Fig. 8 is a plan of the stop bars. Fig. 9 is an end elevation of the fragment of carriage mechanism and the column gage shown at Fig. 1. Fig. 10 is a side view of a typewriter key, showing a circuit controller connected thereto. Fig. 11 is a diagrammatic representation of a modification of my invention, whereby a plurality of columns may be added on separate adding heads; and Fig. 12 is a longitudinal vertical section of a typewriting machine provided with electrical devices in accordance with my invention.

Referring first to Figs. 1, 9, 10 and 12, illustrating the apparatus connected directly with the typewriter, the figure keys $a$, from "1" to "9" inclusive, each operates a circuit controller consisting of contact plates $a^1$ and $a^2$. The plates $a^1$ are electrically connected in series with one another in the circuit 1. The contact plates $a^2$ are the respective terminals of nine wires numbered from 9 to 17 inclusive, and extending to the adding wheel mechanism through a flexible cable or otherwise.

Fixed to the paper carriage frame A of the typewriter are a block $b$ and a clamping plate $b^1$, holding between them a series of metallic pins $b^2$, which stand vertically and with their lower ends exposed and on a level. These pins are the terminals of a series of wires 2 to 8 inclusive, also extending to the adding wheel mechanism through a flexible cable or otherwise.

$c$ indicates a guiding rail or track which is secured to the typewriter frame, as by arms $A^2$, secured by screws $A^3$ to front corner-posts $A^{4x}$ of the framework $A^4$ of the typewriter, adjacent to the scale $A^5$, in front of which index $A^1$ moves. Upon this rail $c$ is a slide $c^1$ provided with a set screw $c^2$ by which its position on the rail may be fixed, and carrying a contact finger $c^3$ adapted to make contact with the lower ends of the pins $b^2$ when in the traverse of the paper-carriage they are carried over the finger; the slide also is provided with a short section of scale $c^4$ having the same divisions as the scale in front of which the index plays, and having as many divisions as there are pins $b^2$. The slide $c^1$ may be set at any position in front of the scale of the machine, and its position, obviously, will determine at what location in the line of writing the circuits of the series 2 to 8 will be closed by the finger $c^3$. The device $c^1$ with its appurtenances may therefore be termed an "adding-column gage". The finger $c^3$ is the terminal of wire 1, which, as before stated, leads to each of the contact plates $a^1$ beneath the keys.

As usual, the carriage is provided with a letter-spacing rack, $A^6$, with which engage escapement dogs $A^7$ and $A^8$ which rock upon an axis $A^9$, and are provided with a forwardly extending operating arm $A^{10}$, from which is suspended, by rods $A^{11}$, a universal-bar $A^{12}$, arranged beneath and transversely of key levers $A^{13}$. To each key lever is connected, by a rod $A^{14}$, a type-bar $A^{15}$, the type-bars being radially arranged about a common printing center, and a platen $A^{16}$ being mounted upon the carriage over the common printing center. Such type-bars as are connected to the keys $a$ bear figure types, and the other type-bars bear letter and character types. Each key lever is provided with a lifting spring $A^{17}$. A returning spring $A^{18}$ is provided for the escapement dogs and universal bar.

Referring now to the adding mechanism, it is again pointed out that these devices may be either secured directly upon the typewriting machine or placed on a table or shelf or other support adjacent thereto, since preferably they are connected to the writing machine only through electrical conductors 2 to 17, which may be arranged in a single cable. The adding mechanism is contained in the casing E, the face of which is provided with an opening $e$ through which the totals may be seen. Immediately behind this opening $e$ is a shaft $f$, upon which are mounted adding disks or wheels $g$, bearing upon their peripheries the figures from zero to 9. The hub of each disk carries a pinion $f^1$ and a notched wheel $f^2$, the latter being used to turn the adding disk when the next disk to the right has completed a rotation. For this purpose each disk is provided with a tens-carrying pin $f^3$, to engage with a tens-carrying star wheel $f^4$ on a counter-shaft $f^5$, there being one star wheel for each disk. The pin strikes an arm of the star wheel and forces it against one of the projections of the notched wheel $f^2$, causing the corresponding disk to move one point forward, thereby adding ten units, tens or hundreds, etc., as the case may be.

In place of the pin $f^3$ a pawl $f^{15}$, pivoted at $f^{16}$ to the disk, and lightly spring-pressed against a stop $f^{17}$ thereon, may be used, so that in case a star wheel should be rotated by a notched wheel at a time when the parts are in the position indicated at Fig. 4, the succeeding tooth of the star wheel will lift the pawl and slip by it, without imparting movement to the disk upon which the pawl is pivoted. The fixed pin $f^3$ answers for the second and third wheels from the left-hand end at Fig. 3, since the star wheels associated therewith are never driven by the two left-hand notched wheels, as the latter are unprovided with independent actuating mechanism.

The counter-shaft $f^5$ is suspended from arms $f^6$, pivoted upon an axis $f^7$, said arms projecting beyond the axis and carrying a stop plate $f^8$, normally standing adjacent to the peripheries of the row of disks. Each disk is also provided with a peripheral pin or tappet $f^9$. The counter-shaft $f^5$ is adapted to be swung backward by a rod $f^{10}$, to carry the star wheels out of the range of movement of the pins $f^3$. The rod $f^{10}$ passes through the front of the case and is there fitted with a knob $f^{11}$ and a catch $f^{12}$, by which an operator may at will throw the star wheels into and out of operative position. When the star wheels are thrust backward, the plate $f^8$ swings forward into the path of movement of tappets $f^9$; and while the parts are in this position the crank $f^{13}$ on the disk shaft may be rotated, and all of the disks turned together, until the tappets $f^9$ are all stopped against the plate $f^8$, in which position all of the disks show zero through the opening $e$. By releasing knob $f^{11}$ the stop plate $f^8$ is removed, and the star wheels swing forward again under the action of spring $f^{14}$ until collar $f^{10x}$ on rod $f^{10}$ abuts against a fixed part of the casing, when the device is in position to again count from zero upward.

The disks are spaced along the shaft $f$ by means of friction washers $f^{18}$, which are splined to the shaft. A compression spring $f^{19}$, bearing at one end against a collar $f^{20}$ secured to the shaft, and at the other end against one of said washers, produces sufficient friction between the washers and the disks to insure the latter being rotated by the shaft at the operation of crank $f^{13}$. An enlarged friction disk or brake $f^{21}$ is also splined to the shaft by means of a pin $f^{22}$, and bears against the inner side wall of the casing at $f^{23}$, to prevent accidental rotation of the shaft.

Corresponding to the series of adding wheels is a series of vertically arranged rack-bars or drivers $h$ adapted to engage with the pinions $f^1$ of the respective adding wheels, but normally disengaged therefrom. Each rack bar is carried by bearings $i^1$ attached to another bar $i$, the latter being hung upon parallel links $i^2, i^2$, pivoted to the face plate of the casing. A spring $i^3$ swings the bars $h$ and $i$ upward and forward, and so out of engagement with the pinions. Another spring $j$ connects bars $h$ and $i$ together, and holds the former in an elevated position. The upper bearing $i^1$ of each bar $i$ is provided with an iron armature $i^4$, and behind the armatures stand electro-magnets $t, t^1, t^2$, etc. When any one of these magnets is energized, the armature and consequently the parts $i^2$ and $h$ are swung downward and backward so that the rack engages the pinion on the hub of the corresponding adding wheel. The rack bars $h$ all extend upward to a point near the top of the casing, adjacent to which is a push bar or actuator $k$, common to all the rack bars and pivoted to the casing at $k^1$. This actuator is adapted to be swung downward by a solenoid magnet K, and afterward returned to normal position by a spring $k^2$. So long as the rack bars occupy their normal or disengaged position, the actuator cannot affect them, but when any one of them is thrown into engagement with its corresponding pinion, its upper end assumes a position directly under the actuator, and if the latter then operates against it, the rack bar is thrust downward until it is stopped, during which movement it rotates its corresponding adding disk. Upon the circuit which controls the magnet $t$ being broken, the spring $i^3$ swings the driver $h$ out of engagement with the pinion, whereupon the spring $j$ elevates the rack to initial position.

The extent of rotation of a given disk determines the quantity added, so that by arranging to stop the downward movement of the rack bar at various points, the quantity added at each operation can be controlled. I have provided such a stopping arrangement in the lower part of the casing of the adding machine. It consists of a series of stop bars P arranged one above the other in a suitable frame $p$, wherein each bar is free to slide independently in a longitudinal direction. Across the front face of the gang of stop-bars, a series of vertical grooves $p^1$ is cut immediately beneath the ends of the drivers $h$. So long as these grooves or cutaways are unobstructed, the driver has free movement across the face of the entire series of stop-bars, but when any one of them is longitudinally displaced the grooves are closed by such displacement, and the drivers can only travel across the face of the stop bars until they are intercepted by the displaced stop bar. It will now be understood that by selecting a certain disk for rotation and a certain stop-bar for determining the extent of its rotation, any amount may be calculated by the machine. With each stop bar is connected a lever $q$ pivoted at $q^1$, and to this lever is attached an armature $q^2$, in front of which is arranged an electromagnet; the nine magnets are mounted upon a suitable bracket $q^4$, and are lettered $w$, $w^1$, $w^2$, etc. When any one of these magnets is energized, the corresponding lever $q$ and stop bar P are moved, the stop bars being returned to their normal positions by springs $q^5$.

Adjacent to the opposite ends of the stop bars are two metallic plates $r$ and $r^1$ suitably insulated from each other, and each having a projection $r^x$ standing in the path of movement of the stop-bars. When any stop-bar is moved by its magnet, it contacts with one projection $r^x$ on each of the two plates $r$ and $r^1$, and closes a circuit which is traced by wires 18 and 19 leading through the solenoid K and the battery G.

In operation, the slide or column gage $c^1$ is adjusted along the rail $c$ until the third division mark on its scale (counting from the left) is opposite the point on the machine scale where the decimal point separating the dollars and cents column occurs; after operating the letter keys to write the first item on the page, the carriage is moved to the left by the operation of the usual release key or spacing key until the carriage index $A^1$ points to that division on the gage scale $c^4$ which corresponds to the position of the first figure of the amount to be written. By reason of this adjustment of the column gage, the "hundreds" adding wheel (the fifth from the left at Figs. 2 and 3) is automatically coupled to all the figure keys at that point in the line of writing at which numerals in the "hundreds" column occur. Thus, if 256.74 is the amount, the index $A^1$ will be stopped at the sixth division of the slide scale from the left, at which point the contact finger $c^3$ will be against the fifth full line pin $b^2$ counting from the right, thereby coupling the magnet $t^4$ to all the figure keys, and simultaneously enabling any chosen key to energize the corresponding stop-operating magnet. Then the figure keys for "2", "5" and "6" are struck in succession, then the period key, and then the figure keys for "7" and "4". When key for the numeral "2" is depressed, the lever $A^{13}$ swings downwardly, and by means of the connecting-rod $A^{14}$ swings the rear type-bar having the type "2" thereon up against the paper on the platen, so that the numeral "2" is imprinted upon the paper. At the same time the universal bar $A^{12}$ is carried down by the key-lever, and the initial movement of the spacing dogs is effected in a well-known manner through the rods $A^{11}$ and the rocker $A^{10}$, all as indicated by dotted lines at Fig. 12. The key-lever also carries down the contact plate $a^1$, so that it touches the contact plate $a^2$, as also indicated by dotted lines, whereby a circuit is closed from the key through wire 1, finger $c^3$, wire 4, magnet $t^4$, wire 19, battery G, wires 20 and 21, magnet $w^1$, wire 10, and back to key "2". The circuits of all the other magnets $w$ and $t$ are open at the keyboard and carriage. The energizing of magnet $t^4$ throws the fifth rack bar or driver $h$ into engagement with its pinion, and the energizing of magnet $w^1$ displaces the second stop bar. The stop bar in moving closes the circuit of the solenoid K through wires 18 and 19, and the actuator $k$ is accordingly pulled downward, forcing the rack bar down until it is arrested by the displaced stop bar. The engagement of the rack and pinion rotates the fifth disk two points forward, showing the figure "2" at the hundreds position, through the opening in front of the machine. The moment the key is released, the key lever, type bar, universal bar and feeding dogs, as well as the contact plate $a^1$, resume their normal positions and the carriage moves a letter space, so that the circuit traced above is broken at two places by the rising of the key and the feeding of the paper carriage, whereupon the several magnets become deënergized and the springs $j$, $q^5$ and $k^2$ return the parts to normal position. At the same time the movement of the paper carriage makes contact between the next pin and the finger $c^3$, thereby coupling the succeeding adding wheel to all the figure keys. Next, the numeral "5" key is struck, the type "5" is imprinted on the paper, and a circuit is closed through wire 1, finger $c^3$, wire 5, magnet $t^5$, wire 19, battery G, wire 20, magnet $w^4$, wire 13, and back to key "5". This effects an operative connection between the fourth rack bar and its adding wheel, and displaces the fifth stop bar, whereupon the circuit of solenoid K is closed and the fourth disk rotated until its figure "5" shows in the opening in front of the casing. In the same manner each of the figures in the amount or quantity is written. In writing the second and succeeding numbers in the column, it is obvious that since the disks are constructed upon the usual plan of adding machines, they will show a total through the opening in the casing corresponding to the total amount written by the machine at any given time. When the column has been finished, the total amount shown by the adding machine may be written underneath the column, the hand switch or controller $s$ having been first shifted; or if the total is written in the next column to the right, as is often the case, the switch $s$ need not be operated since the position of the gage $c^1$ leaves the circuit in normal condition and prevents the further operation of the adding mechanism.

In Fig. 1 two of the pins $b^2$ are shown in dotted lines. On writing amounts of money, or other amounts which it is desired to point off with commas or periods, such characters may be written in at the places where the omitted pins occur, without affecting any of the circuits; thus, while the amount 256.74 occupies six spaces, only five of them are figure spaces, and only five disks of the adding mechanism would be rotated in writing it, the other space being occupied by the period, and the pin for that space being omitted or shifted. Obviously, the position of the pins may be shifted to bring either blank spaces or punctuation intervals at any position or positions in the column, and this adjustability of the pins therefore becomes one important feature of my invention. It will be understood that while I have described the circuit controller as mounted partly upon the paper carriage, the term is intended to comprehend any carriage or connected part which is moved by the spacing devices, or in the event of the invention being used as an adding machine merely, any suitable step-by-step moving device.

Some documents or statements often contain a number of similar or dissimilar columns of figures which have to be written line by line, with the totals in their proper places under each column. In order to do this kind of work with my invention, it is only necessary to provide as many different groups of pins $b^2$ as there are columns, and connect each group with a different adding mechanism, the circuits from the key levers being common to all the adding mechanisms. In Fig. 11 I have illustrated diagrammatically a plan for writing and adding more than one column of figures. The finger $c^3$ is fixed to the frame of the typewriter, and the scale bar $A^{5\times}$, which in this instance is fixed to the movable carriage, carries a number of adding column gages $b$, each containing a set of contact pins $b^2$. These are adjustable along the scale to any position where the columns are to be located and secured by screws $c^{2\times}$. The pointer $A^{1\times}$ is secured to the frame $A^4$. The key circuit controllers are indicated by $a^1$ and $a^2$, as before. The magnets $t$ and $w$ of the two adding mechanisms are shown, the magnets $t$ in one case being connected through the cable T with one set of pins $b^2$, while the magnets $t$ of the other adding mechanism are connected through the cable $T^1$ with the other set of pins $b^2$. A cable $T^2$ connects the circuit controlling plates $a^2$ respectively with the magnets $w$ of both of the adding mechanisms, and the magnets $t$ and $w$ of each adding device are connected by the wires $u$ and $v$, so that any pair of them may be put into series with each other. The battery is in the circuit 1, leading from plates $a^1$ of the key circuit controllers to the finger $c^3$. The operation of this mechanism will be readily understood from that of the mechanism hereinbefore described, but it may be pointed out that since each circuit must be closed at the two points to cause the adding machine to operate, it is evident that when one set of pins is in engagement with the finger $c^3$, only one of the adding heads can respond, and that must be the one in which the magnets $t$ are connected with the pins in operation and thereby coupled to the figure keys. When the writing of any column is finished, its total may be read from the adding mechanism corresponding to it.

It will be noted that the mechanism for controlling the rotation of the adding wheels is disconnected from the keys, and hence no portion thereof is operated, except at that portion of the line of writing during which the column gage completes the electric circuits. At this time, by the depression of any of the figure keys, connection is effected between the common adding-wheel actuator $k$ and an adding wheel, and simultaneously the extent of rotation of the adding-wheel is determined. Inasmuch as power-driven mechanism is employed both to connect the keys with the adding wheels and also to rotate the wheels, as well as to determine the extent of their rotation, the touch upon the figure keys remains practically the same after as before the adding apparatus is connected to the typewriting machine.

The adding-wheels may be operated whenever the carriage is in position for writing the figures in the desired column, independently of any other or further movements of the carriage, so that in the operation of writing and adding a column of figures it is only necessary that the carriage shall move back and forth a distance equal to the width of the column; while at any time, if desired, the carriage may move a longer distance to enable the printing of words or other figures in connection with the adding column. The provision of a scale along which the column gage may slide is of great importance, as it enables said gage to be instantly and accurately set to position for enabling the carriage to properly connect the adding wheels to the figure keys, so that when the figures are printed on the paper they are also added on the corresponding adding wheels, without liability of error or of failure of the adding wheels to act. The column gage can be set to any portion of the line of writing. At all other portions of the line, whether preceding or following the column gage, words may be written, or, if desired, columns of figures may be written without affecting the adding mechanism.

The means for connecting the adding-wheels to the figure keys are positively controlled by the carriage, so that the wheels can be so engaged only one at a time, and only in their proper order. The adjustable blocks $b$ may be termed column locators and the parts $b^2$ may be termed denominational members or dial determining devices, inasmuch as there is one of said parts for each denomination and each of them determines a dial to be operated.

In carrying out my improvements in their several forms it is not essential to follow the precise details of construction herein set forth, as many changes may be made within the scope of the invention. For instance, it is immaterial whether the adding wheels be operated by normally open or normally closed circuits, and the claims relating thereto are therefore intended to cover the several features of invention, as carried out with either kind of circuit. The terms "drivers" and "actuator" employed to designate the parts $k$ and $h$ respectively, are intended as generic terms to apply to various forms of devices to accomplish the ends attained by the particular devices shown.

It will be observed that I have provided an actuator as $k$, common to all of the adding wheels, which is normally out of operative relation with the wheels, but which may be moved into operation relative to an adding wheel at the operation of any key; that a series of drivers as $h$ is associated with the adding wheels, but normally uncoupled or disconnected therefrom, and that any of the keys may couple or connect any of the drivers with its associated adding wheel; that the adding wheels may be thus connected one after another; that upon such connection being made the actuator is automatically called into operation to cause the driver to rotate the adding wheel, said actuator being preferably connected with a suitable source of power, so that the wheel is not driven by power imparted to the key by the finger; that the mechanism for limiting the extent of rotation of each adding wheel is likewise preferably connected to a suitable source of power controlled by the keys; that the drivers are variably arrested by a series of stops; that each stop bar is common to all the drivers, and that the keys control means for determining by which stop bar any moving driver shall be arrested; that each of the endwise sliding stop bars has a series of cutaways, and that the bars are arranged so that said cutaways normally register with the drivers; and that means are arranged between the series of stops and the actuator for causing the latter to act only after the positioning of the selected stop relatively to the driver. The axis of the star wheels is arranged eccentrically to the axis of the adding wheels. It will also be seen that I have provided a series of figure keys, a step-by-step moving device that is connected to a series of adding wheels, and determines which wheel shall be actuated, and suitable connections between a series of figure keys and the said wheels, whereby after the desired wheel has been selected by the step-by-step moving device, any of the series of figure keys may be operated to cause said wheel to be turned to the extent represented by that key. The said step-by-step moving device is in this case in the form of a paper carriage, although so far as many important features of my invention are concerned, it is not essential that a paper carriage be used, so long as a suitable moving device is provided for the purposes set forth. It will further be noted that a series of electrically operated adding wheels is provided, each of which is adapted to be actuated by all of the figure keys; that one portion of my invention comprehends the combination of an adding wheel and electromagnet, means operated by the magnet for rotating the wheel, electric circuits from the magnet to all of the keys, and circuit controllers operated by the keys, whereby any key may be operated to cause the wheel to rotate. The solenoid magnet K is common to all of the adding wheels, means being arranged between said magnet and the adding wheels for rotating the latter. A series of magnets is provided for the series of drivers $h$ and is included in suitable electric circuits having terminals at the figure keys, the latter being provided with suitable contacts connected together in series, whereby upon the operation of any key partial revolution of an adding wheel is effected. Engagement is effected between each rack and its pinion by electrically operated means, whereby the pinions are enabled to be rotated by the racks.

Electrically operated means controlled by the figure keys are provided for moving the stop bars. Each adding wheel is provided with its own magnet, and each stop also is provided with a magnet, said magnets being included in electric circuits; and when said circuits are closed by the keys, a magnet from each of the said two sets of magnets is thrown into series and caused to operate. Electrically operated means are controlled by the stop bars for imparting movement to the actuator $k$, which means are automatically called into action upon the setting of a stop, the electric circuit being thereby completed that energizes the solenoid magnet K. The said circuit is hence controlled by the same series of magnets that control the stop bars. The electric magnets which connect the drivers to the adding wheels are preferably arranged in series with the magnets that control the stops.

Electric circuits connect the adding wheels to the keys and also to the step-by-step moving device, each circuit containing two circuit controllers, one operated by a key and the other by the step-by-step moving device. Said circuits have terminals arranged at the step-by-step moving device, and a contact finger is adapted to make connection with the circuit terminals in succession, said contact device being itself adapted to be connected with any of a series of terminals arranged at the keys. It will also be observed that adjustable, automatically operating means are provided for rendering the adding wheels temporarily inoperative, so that, if desired, a space may be left between any two figures in a number written by the types, without causing errors in the adding operation; that a series of substantially equidistant and concentric adding wheels are provided, together with means for enabling the carriage to couple the wheels in regular succession to the keys at either equal or unequal intervals in the travel of the carriage. Independent mechanism is provided for effecting the rotation of each adding wheel, said mechanism being connected electrically to the keys and to the carriage, together with means whereby any of the electric circuits may be controlled by a carriage movement, supplemented by a movement of any of the figure keys.

An adjustable coupling or connecting device operates automatically to couple the wheel-actuating mechanism to the figure keys of the typewriter at one portion of the line of writing, and to uncouple all of said wheel actuating mechanism from the figure keys at all other portions of the line, whereby numbers may be written in a column and automatically added, and whereby either words or figures may be written upon each line, either preceding or following said adding column, without affecting the adding wheels. The wheels can be connected or coupled only one at a time and only in regular order, the operation taking place when the carriage is at the selected portion of its travel and independently of any further movement thereof, thus avoiding the necessity of retracting the carriage a considerable distance beyond the beginning of the column in order to position the adding mechanism. A scale marked with letter space graduations is arranged in juxtaposition to the column gage, the gage and the scale being relatively movable, whereby the gage may be readily and accurately set, to determine at what portion of the line of writing the adding wheels shall be operated by the figure keys. It will be further noted that I have provided a series of adding heads, each including a series of adding wheels, and electric circuits from the keys to the adding heads, whereby any key may control any adding wheel in any adding head, a series of figure keys being combined with a step-by-step moving device, with a plurality of groups of circuit controllers respectively connected both to the adding wheels and to the step-by-step moving device and determining which of said adding wheels shall be in operation, and with another set of circuit controllers controlled by the keys and common to all the adding wheels in all the groups. Any key may be operated to record the corresponding number and simultaneously operate any adding wheel in any adding head. Groups of circuit controllers are connected to the typewriting mechanism for determining which of the adding mechanisms shall be effective, and another set of circuit controllers is connected to the keys of the typewriting mechanism and common to all the adding heads. An adjustable adding column gage may be provided for either one or more of the series of adding heads; and if more than one gage is used, all of them may be made adjustable along a track so as to automatically couple its associate adding head to the figure keys.

What I claim as new and desire to secure by Letters Patent, is:—

1. The combination of a series of figure keys, a series of adding wheels, an actuator common to all the wheels, but normally out of operative relation therewith, a magnet for moving said actuator and means called into action at the operation of any key for putting any adding wheel into operative relation with the actuator, and also for causing said actuator to be moved by said magnet.

2. The combination of a series of figure keys, a series of adding wheels, a driver associated with each adding wheel but normally disconnected therefrom, a magnet for each driver and means for enabling any of the keys to energize any of said magnets so as to connect its associated driver with its associated adding wheel.

3. The combination of a series of figure keys, a series of adding wheels, a driver associated with each adding wheel but normally disconnected therefrom, and automatically operating means, including a system of magnets under the control of all of said keys, for connecting the drivers one after another with their associated adding wheels.

4. The combination of a series of figure keys, a series of adding wheels, a driver associated with each adding wheel but normally disconnected therefrom, means for enabling any of the keys to connect any of the drivers with its associated adding wheel, and automatically operating means connected with a suitable independent source of power and with the figure keys, and put into action by the same stroke of the key that connects the selected driver with its associated adding wheel, for causing the driver to rotate the adding wheel.

5. The combination of a series of figure keys, a series of adding wheels, a driver associated with each adding wheel but normally disconnected therefrom, means for enabling any of the keys to connect any of the drivers with its associated adding wheel, and an actuator common to all the drivers and adapted to operate automatically to actuate the driver and adding wheel so connected, the said actuator being connected to the figure keys and to a source of power independent of that applied to the figure keys and operating independently thereof after the engagement of the driver and its adding wheel.

6. The combination of a series of figure keys, a series of independently movable adding wheels, key controlled power driven means for rotating them, independent means for variably limiting the extent of rotation of any adding wheel in accordance with the key actuated, and a suitable source of power connected to the keys for operating said limiting means, said source of power being independent of the power applied to the keys.

7. The combination of a series of figure keys, a series of adding wheels, a series of drivers therefor, and a series of stops operated by electromagnetic devices under the control of said keys and adapted to variably arrest said drivers, whereby the stops are operated by a power independent of that applied to the figure keys.

8. The combination of a series of figure keys, a series of adding wheels, a series of movable drivers therefor, a series of stop bars, each common to all the drivers, and means controlled by the keys including a magnet for each stop bar for determining by which stop bar any moving driver shall be arrested, whereby the movement of each stop is effected by power independent of that applied to the figure keys.

9. The combination of a series of figure keys, a series of adding wheels, a series of drivers therefor, a series of sliding stop bars, each common to all the drivers, a system of magnets for said drivers, and a system of magnets for said stop bars, all of said magnets being controlled by said keys.

10. The combination of a series of figure keys, a series of adding wheels, a series of drivers therefor, a series of key-controlled endwise-sliding stop bars, each bar having a series of cutaways, and the bars being normally arranged so that the cutaways register with said drivers, and a system of magnets for operating said adding wheels, said drivers and said stop bars, all of said magnets being controlled by said keys.

11. The combination of a series of figure keys, a series of adding wheels, a driver associated with each adding wheel but normally disconnected therefrom, means for enabling any of the keys to connect any of the drivers with its associated adding wheel, an actuator common to all the drivers and adapted to operate automatically to actuate the driver and wheel so connected, a series of stop bars, each common to all the drivers, and means controlled by the keys for determining by which stop bar the moving driver shall be arrested.

12. The combination of a series of figure keys, a series of adding wheels, a series of drivers therefor, a series of stops for variably arresting said drivers, an actuator for moving the drivers, said actuator being common to all the drivers and means between the series of stops and the actuator for causing the latter to act only after the positioning of the selected stop relatively to the driver, the construction and arrangement being such that the actuator is put into action upon the same stroke of the key that causes the stop to be positioned.

13. The combination of a series of figure keys; a series of adding wheels; a series of drivers for said adding wheels; a series of key controlled stop bars, each constructed to be projected into the paths of all of said drivers; an actuator with which any of said drivers may be engaged; and means controlled by the movement of any stop bar to working position, for imparting movement to said actuator.

14. The combination of a series of figure keys, an adding wheel provided with a pinion, a rack normally disengaged from the pinion, electro-magnetic devices for effecting an engagement of the rack with the pinion, electro-magnetic devices for actuating the rack to rotate the pinion, the said electro-magnetic devices being controlled by the said figure keys, and means for determining the extent of rotation of the pinion.

15. The combination of a series of figure keys, a series of adding wheels arranged upon a common axis and each carrying a pinion, a rack arranged in proximity to each pinion but normally disengaged therefrom, a series of electro-magnetic devices for moving the racks into engagement with the pinions, electro-magnetic devices for actuating the racks to rotate the pinions, all of said electro-magnetic devices being controlled by the said figure keys, and means for determining the extent of rotation of said pinions.

16. The combination of a series of figure keys, two links each pivoted at one end to a framework, a bar pivoted at each end to the free end of one of the links, a rack supported upon and constructed to slide along the bar, a pinion arranged in proximity to the rack but normally disengaged therefrom, an adding wheel connected to the pinion, and means for moving the bar upon the links so as to cause the rack to engage the pinion.

17. The combination of a series of figure keys, an adding wheel, a variable-stroke adding wheel actuator having a plurality of single strokes of different lengths corresponding respectively to the figures represented by said keys, and a plurality of electro-motive stroke-controlling devices included in circuits controlled respectively by said keys and controlling the movements of said actuator.

18. The combination of a series of figure keys, a series of adding wheels, and electromotive actuating means common to all of said adding wheels and controlled by said keys and having a plurality of single strokes of different lengths corresponding respectively to the figures represented by said keys.

19. The combination of a series of figure keys, a series of adding wheels, and electromotive actuating means common to all of said adding wheels and normally out of operative relation therewith and controlled by said keys and having a plurality of single strokes of different lengths corresponding respectively to the figures represented by said keys.

20. The combination of a series of figure keys, a series of adding wheels, and a series of separately-operative electro-motive adding-wheel drivers coöperative respectively with said adding wheels and controlled by said keys and each having a plurality of single strokes of different lengths corresponding respectively to the figures represented by said keys.

21. The combination of a series of figure keys of different numerical values, an adding wheel, a magnet, connections between said magnet and said wheel such that the wheel may be rotated through any selected distance by a single impulse of the magnet, and an electric circuit for said magnet controlled by said keys, the construction and arrangement being such that upon the operation of any key the circuit is closed and said magnet is caused to impart to said wheel a single rotative movement through a distance corresponding to the value of the selected key.

22. The combination of a series of figure keys, a series of adding wheels and electrical devices connecting all of said wheels to any of said keys, said electrical devices including a single contact arranged at each key and also a solenoid magnet common to all of said adding wheels and the construction and arrangement being such that upon completing the circuit once any selected key may through said solenoid magnet cause any adding wheel to rotate to an extent corresponding with the value of the key.

23. The combination of a series of figure keys, a series of adding wheels, and devices for turning said adding wheels, including a variable stroke solenoid magnet common to all of said adding wheels and controlled by said figure keys.

24. The combination of a series of figure keys, a series of adding wheels, an electro-magnet common to all of said adding wheels, electric circuits including the magnet and all of the keys, and means arranged between the magnet and the adding wheels for rotating the wheels.

25. The combination of a series of figure keys, a series of adding wheels, a series of drivers, a series of magnets for the series of drivers and an electrically operated actuator common to all of said drivers, a series of electric circuits having terminals at the series of keys, and a series of contacts also arranged at the keys and connected together in series and each serving to affect a circuit through its magnet upon the operation of its key and thereby cause a partial rotation of one of the adding wheels.

26. The combination of a series of figure keys, a series of adding wheels each provided with a driver normally disconnected therefrom, means controlled by any of the keys for effecting a connection between any driver and its associated adding wheel, and an electrically operated actuator also controlled by the keys for moving any of said drivers when connected to its adding wheel.

27. The combination of a series of figure keys, a series of adding wheels each provided with a driver normally disconnected therefrom, electrically operated means controlled by any of said keys for effecting a connection between each driver and its associated adding wheel, and an electrically operated actuator also controlled by said keys for moving any of said drivers when connected to its adding wheel.

28. The combination of a series of figure keys, a series of adding wheels each provided with a pinion, a series of individually operable key controlled racks normally disengaged from the pinions but engageable therewith, and electrically operated means controlled by said keys for enabling the pinions to be rotated by the racks.

29. The combination of a series of figure keys, an adding wheel provided with a pinion, a rack, key controlled means for moving the rack into engagement with the pinion, and electrically operated means also controlled by said keys for actuating the rack to rotate the pinion.

30. The combination of a series of figure keys, a series of adding wheels, electrically controlled means for rotating the wheels, and electrically controlled means for variably limiting the rotation of the wheels, whereby the rotating means and limiting means are automatically actuated by a power independent of that applied to the figure keys.

31. The combination of a series of adding wheels, key-controlled electrical devices for rotating the wheels, and key-controlled electrical devices for variably arresting the rotation of the wheels.

32. The combination of a series of figure keys, a series of adding wheels, electrically operated devices for rotating the wheels, and electrically operated devices for variably arresting the rotation of the wheels, all of said electrically operated devices being under the control of the said figure keys.

33. The combination of a series of figure keys, a series of adding wheels, an electrically operated driver associated with each wheel, a series of movable stop bars, and electrically operated means controlled by said keys for projecting any stop bar into the paths of said drivers, whereby the rotating means and limiting means are automatically actuated by a power independent of that applied to the figure keys.

34. The combination of a series of figure keys, a series of adding wheels, each provided with rotating means, a series of movable stops for variably limiting the rotation of the adding wheels, a series of electromagnets for moving the stops, a series of wires each terminating at one end in a contact plate arranged at a corresponding key and forming part of an electric circuit for energizing the corresponding magnet, and a series of co-acting contact plates also arranged at the figure keys and connected in series and each serving to affect a circuit upon the operation of a key.

35. The combination of a series of figure keys, a series of adding wheels each provided with a driver normally disconnected therefrom, an actuator for moving any of said drivers so as to rotate its associated adding wheel, and electrically operated means for effecting a connection between any driver and its associated adding wheel, for operating the actuator, and for variably limiting the rotation of the adding wheel.

36. The combination of a series of figure keys, a series of adding wheels, mechanism for rotating each adding wheel, a series of stops corresponding to the keys and adapted to variably limit the rotation of the adding wheels, an electro-magnet controlling each adding-wheel rotating mechanism, an electro-magnet controlling each of the stops, electric circuits including the magnets, and means controlled by the keys for closing said circuits, the construction and arrangement being such that at the operation of any key a magnet from each of the said two sets of magnets may be thrown into series and caused to operate.

37. The combination of a series of figure keys, a series of adding wheels, a series of stops adapted to be moved into position for variably limiting the rotation of the adding wheels, a series of drivers for the adding wheels, an actuator common to all the drivers, and electrically operated means controlled by said stops for imparting movement to said actuator.

38. The combination of a series of figure keys, a series of adding wheels, an electromagnet, means actuated from said magnet for rotating any of the wheels, means for variably limiting the extent of such rotation, and electric connections between said limiting means and said magnet, and so arranged that said magnet is controlled by said limiting means.

39. The combination of a series of figure keys, a series of adding wheels, a series of drivers therefor, an actuator common to all the drivers, an electro-magnet for operating the actuator, a series of electro-magnets controlled by the keys and provided with means for variably limiting the movements of the drivers, and also provided with means for controlling said actuator-operating magnet.

40. The combination of a series of figure keys, a series of adding wheels, a series of drivers normally disconnected from the adding wheels, a series of electro-magnets for connecting the drivers to the adding wheels, mechanism for actuating any driver when connected to its associated adding wheel, an electro-magnet adapted to operate said driver-actuating mechanism, a series of stops for variably limiting the movement of the drivers, a series of electro-magnets for operating the stops, a series of wires forming parts of electric circuits for energizing the magnets, each wire terminating at one end in a contact plate arranged at the corresponding key, and a series of co-acting contact plates also arranged at the keys and connected in series, and each serving as a circuit controller.

41. The combination of a series of figure keys, a series of adding wheels, a series of drivers normally disconnected from the adding wheels, a series of electro-magnets for connecting the drivers to the adding wheels, means for causing the drivers to rotate the wheels, a series of stops for variably limiting the driving movements of said drivers, electro-magnets arranged in series with said magnets and provided with means for operating said stops, and suitable electric connections from the magnets to the keys.

42. The combination of a series of figure keys, magnets $w$ to $w^8$, wires 9 to 17 connecting said keys to said magnets, conductors connecting said magnets with the source of power, means for completing a circuit back to the keys, stop bars P, levers $q$ for actuating said stop bars, drivers $h$, and adding wheels $g$ controlled by said drivers.

43. The combination of a series of figure keys, magnets $w$ to $w^8$, wires 9 to 17 connecting said keys to said magnets, stop bars P, levers $q$ for actuating said stop bars, drivers $h$, adding wheels $g$ controlled by said drivers, magnets $t$ to $t^6$ for controlling said drivers, and suitable electric connections from the magnets $t$ to $t^6$ to the keys, and means for completing the circuit, said circuit including a source of power.

44. The combination of a series of figure keys, magnets $w$ to $w^8$, wires 9 to 17 connecting said keys to said magnets, stop bars P, levers $q$ for actuating said stop bars, drivers $h$, adding wheels $g$ controlled by said drivers, magnets $t$ to $t^6$ for said drivers and provided with suitable electric connections to the keys, actuator $k$ common to all the drivers, means for completing the circuit, said circuit including a source of power, solenoid magnet K, and means for electrically connecting the latter to the source of power.

45. The combination of a series of adding wheels, means for turning the same, a series of figure keys, a plurality of electric circuits between said wheels and said keys, so disposed that any and all of the keys may cause the rotation of any and all of the wheels, and an intermediate movable circuit controller adapted by its position to select or determine which wheel of the series shall be affected by any of said keys.

46. The combination of a series of figure keys, a series of adding wheels each provided with electric connection to all the keys, and a device provided with an electric connection to the keys and constructed to move automatically step-by-step at the operation of the keys and also electrically connected to the adding wheels in such manner that its position determines which adding wheel shall be rotated at the operation of any key of the series.

47. The combination of a series of figure keys, a series of power-driven adding wheels each of which is controllable by any of the keys, and a device constructed to move automatically step-by-step at the operation of the keys and electrically connected to the adding wheels in such manner that its position determines which adding wheel shall be rotated at the operation of any key of the series.

48. The combination of a series of figure keys, a series of adding wheels, electric circuits connecting all the wheels to all the keys, and a device constructed to move automatically step-by-step at the operation of the keys and provided with means for successively controlling said circuits.

49. The combination of a series of figure keys, a series of adding wheels, a series of open circuits, as 2 to 8, one circuit for each adding wheel, and each circuit being suitably connected to all of the keys, and means for closing said circuits in rotation.

50. The combination of a series of figure keys, a series of adding wheels, a step-by-step moving device, and electric circuits connecting the adding wheels to the keys and to the step-by-step moving device, each circuit containing two circuit controllers, one operated by a key and the other by the step-by-step moving device.

51. The combination of a series of figure keys, a series of adding wheels, a step-by-step moving device, electric circuits connecting the adding wheels to the keys and to the step-by-step moving device and having terminals arranged at the step-by-step moving device, and a contact finger constructed to make connection with said circuit terminals in succession, said circuits also having terminals at the keys.

52. The combination of a series of figure keys, a series of adding wheels, a step-by-step moving device, electric circuits connecting the adding wheels to the keys and to the step-by-step moving device, some of said circuits having terminals at said keys, and others having terminals at said step-by-step moving device, and a contact device constructed to make connections successively with the terminals at the step-by-step moving device and itself adapted to be connected with any of the terminals at the keys.

53. The combination of a series of figure keys, a series of adding wheels, a step-by-step moving device, terminals $a'$ connected in series, wire 1, closer $c^3$, pins $b^2$, wires 2 to 8, magnets $t$ to $t^6$, rack bars $h$, magnets $w$ to $w^8$, conductors connecting the two series of magnets, wires 9 to 17, terminals $a^2$, stop bars P, terminals $r$, $r'$, solenoid magnet K, and universal actuator $k$.

54. The combination of a series of figure keys, each operatively connected to a corresponding type, a series of adding wheels operatively controlled by the keys, and means adjustable to render the adding wheels successively operative either at successive imprints of the type or at greater intervals, whereby spaces may or may not be left between the impressions of the types without affecting the adding wheels.

55. The combination of a series of figure keys, a step-by-step moving device, wires 9 to 17, magnets $w$ to $w^8$, levers $q$, stop bars P, drivers $h$, adding wheels $g$, magnets $t$ to $t^6$, and suitable connections from the magnets to the step-by-step moving device and to said keys for completing a circuit.

56. The combination of a series of figure keys, a step-by-step moving device, wires 9 to 17, magnets $w$ to $w^8$, levers $q$, stop bars P, drivers $h$, adding wheels $g$, magnets $t$ to $t^6$, suitable connections from the magnets to a step-by-step moving member and to said keys, an actuator $k$ common to all said drivers, solenoid magnet K, and means for connecting the magnet to said keys and for completing a circuit.

57. The combination of a series of figure keys each operatively connected to a corresponding type, a carriage connected to the keys for spacing movements, a series of adding wheels each suitably connected to all the keys and also to the carriage, so that the adding wheels may be rotated consecutively according to the position of the carriage, and adjustable automatically operating means for rendering the adding wheels temporarily inoperative during one or more movements of the carriage, so that spacing between the orders may or may not be produced, as desired, without causing error in the adding operation.

58. The combination of a series of figure keys each operatively connected to a corresponding type, a carriage connected to the keys for spacing movements, a series of adding wheels each suitably connected to all the keys, and devices adjustable in the direction of the travel of the carriage for connecting the adding wheels to the carriage so that the adding wheels may be operated in regular succession either at successive character spacing movements of said carriage or at greater intervals as desired.

59. The combination of a series of figure keys each operatively connected to a corresponding type, a carriage connected to the keys for spacing movements, a series of substantially equidistant and concentric adding wheels connected to all the keys, and adjustable means for enabling the carriage to operatively connect the adding wheels in regular succession to the keys at either equal or unequal intervals in its travel.

60. The combination of a series of figure keys each operatively connected to a corresponding type, a carriage connected to the keys for spacing movements, a series of adding wheels provided with suitable rotating mechanism, means controlled by the keys for coupling said wheels one at a time to said keys, and electrical connections between said keys and said wheel-operating mechanism whereby when operated to cause the types to record amounts the keys correspondingly affect said wheel-rotating mechanism, and thereby cause said wheels to add the amounts recorded.

61. The combination of a series of figure keys each operatively connected to a corresponding type, a carriage connected to the keys for spacing movements, a series of adding wheels, electrical connections from all of the wheels to each figure key, and automatically operating means for coupling or connecting the wheels in regular succession to said keys, whereby any key may be depressed to imprint its connected type upon the paper and simultaneously cause the number represented thereby to be added.

62. The combination of a series of figure keys each operatively connected to a corresponding type, a carriage connected to the keys for spacing movements, a series of adding wheels each electrically connected to all of said keys, and suitable circuit controlling apparatus connecting said carriage to said wheels, whereby the carriage at its spacing movements automatically connects the adding wheels in regular succession to said keys.

63. The combination with a writing mechanism, including a series of figure keys, a series of corresponding types and a carriage, of a series of adding wheels, independent mechanism for rotating each adding wheel, electric circuits connecting said adding mechanism to said keys and said carriage, and means whereby any of said circuits may be controlled by a carriage movement supplemented by a movement of any of said keys.

64. The combination with a writing mechanism, including a series of figure keys, a series of corresponding types and a carriage, of a series of adding wheels, independent mechanism for rotating each adding wheel, and electric circuits connecting said adding mechanism to said keys and said carriage, each of which circuits contains two circuit controllers, one operated by a key and the other by the carriage.

65. The combination of a series of figure keys each operatively connected to a corresponding type, a carriage connected to the keys for spacing movements, a series of adding wheels, electric circuits connecting the adding wheels to the keys and to the carriage and having terminals arranged at the carriage, and a contact finger adapted to make connection with said circuit terminals in succession.

66. The combination of a series of figure keys each operatively connected to a corresponding type, a carriage connected to the keys for spacing movements, a series of adding wheels, electric circuits connecting the adding wheels to the keys and to the carriage, some of said circuits having terminals at said keys, and others having terminals at the carriage, and a contact device constructed to make connections successively with the terminals at the carriage and itself adapted to be connected with any of the terminals at said keys.

67. The combination with a writing mechanism including a series of figure keys, a series of corresponding types and a carriage controlled by said keys, of a series of adding wheels, independent mechanism for rotating each adding wheel, stop mechanism to determine the extent of such rotation, and electro-magnetic devices controlled by said writing mechanism for operating said stop mechanism and said wheel-rotating mechanism.

68. The combination with a series of figure keys each operatively connected to a corresponding type, and a carriage connected to the keys for spacing movements, of a series of adding wheels each of which is operable on the actuation of one of said keys, connected with the keys and carriage by electric circuits having terminals arranged at said carriage, said terminals being adjustable one or more type-spaces apart, and a contact finger adapted to make connection with the circuit terminals in the succession according to which they are arranged.

69. The combination with a series of figure keys each operatively connected to a corresponding type, and a carriage connected to the keys for spacing movements, of a series of adding wheels connected with the keys and carriage by electric circuits having a series of relatively adjustable terminals, and means for enabling the carriage to control said circuits in regular order through said terminals, whereby the adding wheels may be rotated in regular order either at regular or irregular intervals.

70. The combination with a typewriting mechanism, including a series of letter types, a series of figure types, keys therefor, and a carriage connected to the keys for letter space movements, of a series of adding wheels provided with suitable actuating mechanism, and suitable adjustable connecting devices operating automatically to connect the said wheel-actuating mechanism to said figure keys at any portion of the line of writing and to disconnect all of said wheel-actuating mechanism from said figure keys at other portions of the line of writing.

71. The combination with a typewriting mechanism including a series of letter types, a series of figure types, keys therefor, and a carriage connected to the keys for letter space movements, of a series of adding wheels connected to a suitable source of power which is controllable by said figure keys but is independent of the power applied thereto, whereby the wheels may be rotated, suitable mechanism for variably limiting the rotation of the adding wheels, and suitable adjustable coupling devices operating automatically to connect said source of power and said limiting mechanism to said figure keys at any portion of the line of writing and to disconnect said source of power and said limiting mechanism from said figure keys at other portions of the line of writing.

72. The combination with a typewriting mechanism, including a series of letter types, a series of figure types, keys therefor, and a carriage connected to the keys for letter space movements, of a series of adding wheels, suitable means for automatically establishing adjustable connections from said figure keys to said adding wheels, said means adapted to coöperate with said carriage to automatically and progressively connect said adding wheels to said figure keys during the writing of any selected portion of each line, and to automatically disconnect the adding wheels from the figure keys at all other portions of each line, whereby numbers may be written in a column and automatically added, and whereby either words or figures may be written upon each line either preceding or following said adding column, without affecting said adding wheels.

73. The combination with a typewriting mechanism, including a series of letter types, a series of figure types, keys therefor, and a carriage connected to the keys for letter space movements, of a series of adding wheels, suitable connections from said figure keys to said adding wheels, and an adjustable adding-column gage constructed to connect said adding wheels automatically to said figure keys during the writing of any portion of each line, and to disconnect said adding wheels automatically from said figure keys at all other portions of each line.

74. The combination with a typewriting mechanism, including a series of letter types, a series of figure types, a series of keys therefor, and a carriage connected to the keys for letter space movements, of a series of adding wheels, suitable connections from said figure keys to said adding wheels, and an adjustable adding-column gage adapted to coöperate with said carriage at a predetermined portion of the line of writing, to connect said adding wheels to said figure keys, whereby said wheels can be connected only one at a time and only in regular order.

75. The combination with a typewriting mechanism, including a series of letter types, a series of figure types, a series of keys therefor, and a carriage connected to the keys for letter space movements, of a series of adding wheels, suitable connections from said figure keys to said adding wheels, and an adjustable adding-column gage adapted to coöperate with said carriage at a predetermined portion of each line of writing, to connect said adding wheels to said figure keys, the construction and arrangement being such that the adding wheels may be operated whenever the carriage is arrested at the selected portion of its travel upon its movement in either direction.

76. The combination with a typewriting mechanism, including a series of letter types, a series of figure types, keys therefor, and a carriage connected to the keys for letter space movements, of a series of co-axial adding wheels arranged at intervals exceeding the letter space movements of said carriage, suitable connections from said figure keys to said adding wheels, and an adjustable adding-column gage adapted to coöperate with said carriage at a predetermined portion of each line of writing, to connect said adding wheels consecutively to said figure keys, whereby said adding wheels can be connected only one at a time and only in proper order.

77. The combination with a typewriting mechanism, including a series of letter types, a series of figure types, a series of keys therefor, and a carriage connected to the keys for letter space movements, of a series of adding wheels provided with suitable connections to said figure keys, and an adjustable adding-column gage connected to means for automatically connecting said adding wheels one after another to said figure keys.

78. The combination with a typewriting mechanism, including a series of letter types, a series of figure types, a series of keys therefor, and a carriage connected to the keys for letter space movements, of a series of adding wheels provided with operating mechanism, and an adjustable adding-column gage connected to said carriage and provided with means for automatically coupling all of said wheel-operating mechanism to said figure keys at one selected portion of the line of writing, and automatically uncoupling all of said wheel-operating mechanism from said figure keys at another portion of the line of writing.

79. The combination with a typewriting mechanism, including a series of letter types, a series of figure types, a series of keys therefor, and a carriage connected to the keys for letter space movements, of a series of adding wheels provided with suitable connections to said figure keys, an adjustable adding-column gage for controlling said connections from the wheels to the keys, and a scale marked with letter-space graduations arranged at said column gage, the gage and the scale being relatively movable, whereby the gage may be readily and accurately set to predetermine at what portion of the line of writing the adding wheels shall be operated by the figure keys.

80. The combination with a typewriting mechanism, including a series of letter types, a series of figure types, a series of keys therefor, and a carriage connected to the keys for letter space movements, of a series of adding wheels provided with suitable connections to said figure keys, a rail arranged parallel with the travel of said carriage, an adding-column gage adjustably mounted upon said rail and provided with means for controlling said connections from the adding wheels to the figure keys, and a scale arranged upon the machine in proximity to the column gage.

81. The combination with a typewriting mechanism, including a series of letter types, a series of figure types, a series of keys therefor, and a carriage connected to the keys for letter space movements, of a series of adding wheels, a driver for each adding wheel, said driver being normally disconnected from the adding wheel, and all of said drivers being connected to said figure keys, and an adding-column gage adjustable in a line parallel with the travel of said carriage and provided with means for enabling said drivers to connect one at a time with their associated adding-wheels at successive spacing movements of said carriage.

82. The combination of a typewriting mechanism, including a series of letter types and figure types and keys therefor and a carriage, an adding mechanism, and suitable electric circuits connecting the typewriting mechanism to the adding mechanism, each of which circuits contains two circuit controllers, one operated by a figure key and the other by said carriage.

83. The combination with a typewriting mechanism, including a series of letter types, a series of figure types, a series of keys therefor, and a carriage connected to the keys for letter-space movements, of a series of adding wheels connected to a suitable source of power, means for automatically coupling said adding wheels to said figure keys at a predetermined point in the line of writing, whereby the adding wheels may be rotated at the depression of said figure keys, and electrically operated means controlled by said figure keys for variably limiting the extent of rotation of the wheels.

84. The combination with a typewriting mechanism, a series of adding wheels connected to move one another successively on the completion of a revolution, mechanism for operating said adding wheels, electric circuits connecting said typewriting mechanism to said adding-wheel operating mechanism, electro-magnetic devices controlled by said circuits for determining which of said adding wheels shall be rotated and the extent of its rotation, and means for rotating the adding wheels after such determinations are made.

85. The combination with a typewriting mechanism of an adding mechanism containing a series of number disks, independent mechanism for rotating each disk, a series of stops corresponding to the series of figure keys on the typewriting mechanism, said stops being adapted to limit the extent of rotation of the disks, an electro-magnet controlling each disk-rotating means, an electro-magnet controlling each of said stops, a series of electric circuits each of which is adapted to include in series a magnet from each of the two sets of magnets, and means arranged at the typewriting mechanism for controlling said circuits.

86. The combination of typewriting mechanism including a carriage, an adding mechanism connected thereto by electric circuits, circuit controllers operated by the figure keys of the typewriting mechanism, and adjustable means for determining at what location in the line of writing the said circuit controllers shall be effective.

87. The combination of typewriting mechanism, including a carriage, an adding mechanism connected with said carriage by electric circuits, a circuit controller operated by the movements of said carriage, and adjustable means for determining in what position on a line of writing the adding mechanism shall be operative.

88. The combination with a typewriting mechanism including a series of letter types and figure types, keys therefor, and a carriage connected to the keys for letter space movements, of a series of adding wheels, a group of contact points and a circuit closer, one of which is fixed, and the other thereof being mounted upon the carriage, and either said group or said closer being adjustable independently of the carriage along the line of carriage travel, and electric circuits from said adding wheels to said group of contact points and to said circuit closer.

89. The combination of a typewriting mechanism, including a carriage, an adding mechanism connected with said typewriting mechanism by electric circuits, a circuit closer operated by the moving carriage and adjustable to operate at any position in the line of writing, and a circuit controller operated by the figure keys of the typewriting mechanism and located in series with the first mentioned circuit controller.

90. The combination of a typewriting mechanism, including a carriage, an adding mechanism connected with said typewriting mechanism by electric circuits having as parts thereof terminals arranged a letter space apart on said carriage, and a contact finger adapted to make connection with the circuit terminals in succession, one of said parts being adjustable parallel with the traverse of the carriage.

91. The combination of a series of figure keys each operatively connected to a corresponding type, a carriage connected to the keys for spacing movements, a series of adding wheels provided with suitable rotating mechanism, suitable electric circuits connecting said keys to said wheel-operating mechanism, whereby in operating said types to record amounts the keys correspondingly affect said wheel-rotating mechanism, and a manually-operated circuit controller, S, whereby said adding wheels may, if desired, be rendered inoperative during the recording of amounts.

92. The combination with a typewriting mechanism, including a series of letter types and figure types, keys therefor, and a carriage connected to the keys for letter space movements, of a series of adding wheels, an adding-column gage adjustable along the line of travel of said carriage and provided with means for automatically connecting said adding wheels to said figure keys at a selected point in the line of writing, whereby in operating said figure types to record amounts the keys cause said adding wheels to automatically add the amounts recorded, and a disconnecting device for rendering said adding-column gage and said adding-wheels inoperative, if desired, during the recording of said amounts.

93. The combination of a series of figure keys, a series of adding heads each including a series of adding wheels, and electric circuits from said keys to said adding heads suitably constructed to enable any key to control any adding wheel in any adding head.

94. The combination of a series of figure keys, a step-by-step moving device, a plurality of groups of adding wheels, a plurality of groups of circuit controllers respectively connected to the adding wheels and to said step-by-step moving device and determining which of said adding wheels shall be in operation, and another set of circuit controllers controlled by said keys and common to all the adding wheels in all the groups.

95. The combination of a series of figure keys, a step-by-step moving device, a plurality of adding heads each including both a series of adding wheels, and a series of magnets, as $t$ to $t^6$, each magnet being operatively connected to the corresponding adding wheel, a wire connecting each of said magnets in each of the adding heads to said step-by-step moving device, and a single series of circuit closers controlled by the keys and common to all of said magnets, for completing the circuit between any of said magnets and the step-by-step moving device.

96. The combination of a series of figure keys, a step-by-step moving device, a plurality of adding heads each including both a series of adding wheels and a series of magnets, as $t$ to $t^6$, each magnet having an electric connection to said step-by-step member and being operatively connected to the corresponding adding wheel, and each adding head also including both a series of stops for variably limiting the rotation of the adding wheels, a series of magnets $w'$ to $w^8$ for the stops, the magnets $w'$ to $w^8$ being connected in series to the magnets $t$ to $t^6$, and a single series of circuit controllers connected to the keys and common to all of said magnets, for completing the circuit between any of said magnets and said step-by-step moving device.

97. The combination of a series of figure keys each operatively connected to a corresponding type, a carriage connected to the keys for spacing movements, a plurality of adding heads each including a series of adding wheels, and suitable electric circuits from said keys to said adding heads, whereby any key may be operated to record the corresponding numeral and simultaneously cause any adding wheel in any adding head to add the numeral recorded.

98. The combination with a typewriting mechanism of a plurality of adding mechanisms electrically connected thereto, and groups of circuit controllers connected to the typewriting mechanism and determining which of the adding mechanisms shall be effective.

99. The combination with a typewriting mechanism of a plurality of adding mechanisms electrically connected therewith, a plurality of groups of circuit controllers respectively connected to the adding mechanisms and determining which of said mechanisms shall be effective, and another set of circuit controllers connected to the keys of the typewriting mechanism and common to all the adding mechanisms.

100. The combination with a typewriting mechanism, including a series of letter types and figure types, keys therefor, and a carriage connected to the keys for letter space movements, of a plurality of adding heads connected to the carriage and to the keys and constructed to be operated one at a time, and an adjustable adding-column gage for at least one of the adding heads.

101. The combination with a typewriting mechanism, including a series of letter types, a series of figure types, keys therefor, and a carriage connected to the keys for letter space movements, of a plurality of adding heads connected to the carriage and to the keys and constructed to be operated one at a time, a track arranged parallel with said carriage, and a series of adding-column gages adjustable along said track and each operating to automatically couple its associated adding head to said figure keys.

102. The combination with a typewriting mechanism, including a series of letter types, a series of figure types, a series of keys therefor, and a carriage connected to the keys for letter space movements, of a plurality of adding heads electrically connected to said figure keys and constructed to be operated one at a time, and a plurality of adjustable adding-column gages each operating to automatically couple its associated adding-head to said figure keys.

103. The combination of a typewriting machine, including a carriage, an adding mechanism and electric circuits connecting the two, each of which contains two circuit controllers, one operated by a figure key and the other by the carriage, for the purpose set forth.

104. The combination of a typewriting machine, including a carriage, an adding mechanism connected therewith by electric circuits, and a circuit controller operated by the movement of the carriage to determine in what position on a line the adding mechanism shall be operative.

105. The combination of a typewriting machine, including a carriage, an adding mechanism connected therewith by electric circuits, a circuit closer operated by the moving carriage and adjustable to operate at any position in the line of writing, and a circuit controller operated by the figure keys and located in series with the first mentioned circuit controller.

106. The combination of a typewriting machine, including a carriage, an adding mechanism connected thereto by electric circuits, some of which have terminals at the figure keys on the typewriter, while others have terminals upon the moving carriage of the typewriter, and a relatively fixed contact device adapted to make connections successively with the terminals on the carriage and itself adapted to be connected with any of the terminals at the figure keys.

107. The combination with a typewriting machine, of an adding mechanism containing a series of number disks, independent mechanism for rotating each disk, and a series of stops corresponding to the series of figure keys on the typewriting machine, said stops being adapted to limit the extent of rotation of the disks, an electro-magnet controlling each disk rotating means, an electromagnet controlling each of the stops, a series of electric circuits each of which includes in series a magnet from each of the two sets of magnets, and a mechanism on the typewriting machine for closing said circuits.

108. The combination with a typewriting machine, of a plurality of adding mechanisms electrically connected therewith and groups of circuit closers controlled by the typewriting machine and determining which of the adding mechanisms shall be effective.

109. The combination with a typewriting machine, of a plurality of adding mechanisms electrically connected therewith, a plurality of groups of circuit closers, respectively connected with the adding mechanisms and determining which of said mechanisms shall be in operation, and another set of circuit closers controlled by the key levers and common to all the adding mechanisms.

110. The combination of a typewriting machine, including a carriage, an adding mechanism connected therewith by electric circuits having terminals arranged on the moving carriage, said terminals being adjustable one or more letter spaces apart, and a contact finger adapted to make connection with the circuit terminals in the succession according to which they are arranged, whereby the position on the line of writing at which the numerals of an amount shall occur is determined.

111. The combination of a typewriting machine, an adding mechanism connected therewith by electric circuits having terminals arranged on the movable carriage, means for determining which of the terminals shall be operative and a contact finger adapted to make connection with the circuit terminals in the succession according to which they are arranged.

112. The combination of a series of figure keys, a series of adding wheels, a driver for each adding wheel, an electro-magnet for each adding wheel, an armature for each electro-magnet and associated with each driver, a series of stops for determining the extent of rotation of each adding wheel when operated by its associated driver, a magnet and armature for each stop, a series of electric conductors connecting the series of magnets associated with the series of adding wheels with the series of figure keys, and another series of electric conductors connecting the series of magnets which operate the said limiting stops with the said figure keys, whereby when any one of the figure keys is actuated, the electro-magnet connected with the selected driver is put into operative relation therewith, and by the same movement of said key the electro-magnet corresponding to the actuated key is energized to actuate its associated stop and move it to a position such that the selected adding wheel shall have a limited rotary movement corresponding with the value of the actuated key.

113. The combination of a series of figure keys, a series of adding wheels, a driver for each adding wheel, an electro-magnet for each adding wheel, an armature for each electro-magnet and associated with each driver, a series of stops for determining the extent of rotation of each adding wheel when operated by its associated driver, a magnet and armature for each stop, a series of electric conductors connecting the series of magnets associated with the adding wheels to the series of figure keys, another series of electric conductors connecting the magnets which operate said limiting stops to said figure keys, an actuator common to all of said drivers, and a key controlled electro-magnet for moving said actuator, whereby when any one of the figure keys is actuated the electro-magnet connected to the selected driver is put into operative relation therewith, and by the same movement of said key the electro-magnet corresponding to the actuated key is energized to actuate its associated stop and move it to a position such that the selected adding wheel shall be given a rotary movement corresponding with the value of the actuated key, while by the same movement of said key the electro-magnet controlling said actuator is energized and the actuator is caused to actuate the driver, which in turn rotates said wheel until arrested by said stop.

114. The combination of a series of figure keys, a series of adding wheels, a driver for each adding wheel, an electro-magnet for each adding wheel, an armature for each electro-magnet and associated with each driver, a series of stops for determining the extent of rotation of each adding wheel when operated by its associated driver, a magnet and armature for each stop, a series of electric conductors connecting the series of magnets associated with the series of adding wheels with the series of figure keys, another series of electric conductors connecting the series of magnets which operate the said limiting stops with the said figure keys, whereby when any one of the figure keys is actuated, the electro-magnet connected with the selected driver is put into operative relation therewith, and by the same movement of said key the electro-magnet corresponding to the actuated key is energized to actuate its associated stop and move it to a position such that the selected adding wheel shall have a limited rotary movement corresponding with the value of the actuated key, and means for automatically determining which adding wheel shall be actuated by the time any figure key is struck.

115. The combination of a series of figure keys, a series of adding wheels, a driver for each adding wheel, an electro-magnet for each adding wheel, an armature for each electro-magnet and associated with each driver, a series of stops for determining the extent of rotation of each adding wheel when operated by its associated driver, a magnet and armature for each stop, a series of electric conductors connecting the series of magnets associated with the adding wheels to the series of figure keys, another series of electric conductors connecting the magnets which operate said limiting stops to said figure keys, an actuator common to all of said drivers, a key-controlled electro-magnet for moving said actuator, whereby when any one of the figure keys is actuated the electro-magnet connected to the selected driver is put into operative relation therewith, and by the same movement of said key the electro-magnet corresponding to the actuated key is energized to actuate its associated stop and move it to a position such that the selected adding wheel shall be given a rotary movement corresponding with the value of the actuated key, while by the same movement of said key the electro-magnet controlling said actuator is energized and the actuator is caused to actuate the driver which in turn rotates said wheel until arrested by said stop, and a step-by-step moving device controlled by said figure keys for automatically determining which adding wheel shall be actuated at the time any figure key is struck.

116. The combination of a series of figure keys, each operatively connected to a corresponding type, a carriage connected to the keys for spacing movements, a series of substantially equidistant and concentric adding wheels connected to all the keys, and means for enabling the carriage to couple the adding wheels in regular succession to the keys at unequal intervals in its travel.

117. The combination of a series of figure keys each operatively connected to a corresponding type, a carriage connected to the keys for spacing movements, a series of adding wheels provided with suitable rotating mechanism, and electro-magnetic mechanism connecting said keys and said wheel-operating mechanism, so that when said keys are operated to cause the types to record amounts, they correspondingly affect said wheel rotating mechanism and thereby cause said wheels to add the amounts recorded, said electro-magnetic mechanism including a single wheel-rotating contact arranged at each key, and the construction and arrangement being such that any wheel may be rotated by a single electric impulse through a distance corresponding to the value of the selected key.

118. The combination of a series of letter types and figure types and keys therefor, a carriage connected to the keys for letter space movements, a series of adding wheels controlled by said figure keys, and electrically operated adjustable devices automatically connecting said adding wheels to said carriage at one portion of the line of writing, whereby numbers may be written at said portion of the line and automatically added, and whereby words having reference to said numbers may be written at another portion of the line.

119. The combination of a series of figure keys, a series of adding wheels, electrically operated devices for rotating the wheels, electrically operated devices for variably limiting the rotation of the wheels, all of said electrically operated devices being under the control of the said keys, and adjustable means also controlled by said keys for causing the said wheels one at a time to be coupled automatically with said keys.

120. The combination of a series of figure keys, a series of adding wheels, an electro-magnetic actuator controlled by said keys and common to all of said wheels, and electro-magnetic stop mechanism controlled by said keys, for automatically arresting said wheels and actuator at different points corresponding to the different values of the keys.

121. The combination with means for printing numbers, one digit at a time, and a series of adding wheels, one for each denomination, of means for selecting an adding wheel according to the denomination to be printed; and means for turning said wheel according to the number printed; said selecting means being changeable at will to vary the spacing of the printing.

122. In a device for printing and adding numbers of a plurality of denominations, the combination of means for printing numbers in a plurality of denominations; a series of adding wheels, one for each denomination; means for adding on each wheel an amount corresponding to the digit printed in the denominational position corresponding to such wheel; and means adjustable at will to vary the spacing of the printing for the purpose of punctuation.

123. In a device for printing and adding numbers in a plurality of denominations, the combination with means for printing numbers in a plurality of denominations and means for adding the numbers printed; of means adjustable at will to vary the spacing of the printing.

124. The combination of figure keys, adding wheels, a driver for each adding wheel and normally out of connection therewith, a single actuator, and means for automatically bringing each driver into the path of the actuator and connecting it with its associated adding wheel, said means being controlled by the figure keys but operable independently of the power applied thereto.

125. The combination of keys, printing mechanism operable by said keys, and adding mechanism including differential mechanism, said adding mechanism controlled by said keys and wholly operable by a power independent of that applied to the keys.

126. The combination of keys, printing mechanism operable by said keys, adding wheels, drivers therefor, an actuator for said drivers, and mechanism controlled by said keys and wholly operable by a power independent of that applied to the keys for connecting said drivers to said adding wheels and for actuating said actuator.

127. In a combined calculating and writing machine, the combination of calculating mechanism, writing mechanism, finger keys, and means for affording an actuation of every portion of said calculating mechanism by a power entirely independent of that applied to the finger keys.

128. In a combined calculating and writing machine, the combination of calculating mechanism, writing mechanism, finger keys for controlling the operation of said calculating and writing mechanisms, and automatically actuated means for affording an actuation of every portion of said calculating mechanism by a power entirely independent of that applied to the finger keys.

129. In a combined typewriting and adding machine, the combination of writing instrumentalities, an adding device, finger keys for controlling the operation of said writing instrumentalities and adding device, and automatically actuated means for affording an actuation of every portion of said adding device by a power entirely independent of that applied to the finger keys.

130. The combination with a typewriting machine and finger keys therefor, of an adding device controlled by said finger keys, and automatically actuated means for affording an actuation of every portion of said adding device by a power entirely independent of that applied to actuate the typewriting machine.

131. The combination with a writing mechanism and an adding device, of means for affording an actuation of every portion of the adding device upon the actuation of the writing mechanism by a power entirely independent of that applied to operate the writing mechanism.

132. The combination of a writing mechanism, an adding mechanism, finger keys common to and controlling both mechanisms, and a separate power for actuating the entire adding mechanism, whereby the finger keys are employed only to actuate the writing mechanism and to select and predetermine those members of the adding mechanism which are to be independently actuated by said extraneous power.

133. The combination of a writing mechanism, an adding mechanism, finger keys common to and controlling both mechanisms, but adapted only to transmit the pressure thereon to operate said writing mechanism, an extraneous power for actuating said adding mechanism, and means controlled by said finger keys for merely calling into action said extraneous power and causing it to automatically operate said adding mechanism and thus relieve the fingers of the operator entirely from the work of actuating said adding mechanism.

134. The combination of a series of figure keys, each operatively connected with a corresponding type, a carriage connected to the keys for spacing movements, a series of substantially equidistant adding wheels each controlled by any key of the series, and means for enabling the carriage to couple the adding wheels in regular succession to the keys at unequal intervals, said means being adjustable to vary the spacing of the printing.

135. The combination with typewriting mechanism and adding mechanism, of electric circuits controlled by the carriage of the typewriting mechanism and controlling said adding mechanism.

136. The combination with a typewriting machine, of an adding machine adapted to automatically add numbers written by the typewriting machine in a plurality of denominations and connected to said typewriting machine by electric circuits.

137. A mechanism for adding numbers, said mechanism being controlled by electromagnets, the electric circuits of which are controlled by the keys and carriage of a typewriting machine.

138. The combination of a series of figure keys, a series of adding wheels, and devices for turning said adding wheels including a variable-stroke magnet common to all of said adding wheels and controlled by said figure keys.

139. The combination of a series of figure keys, an adding wheel, a variable-stroke magnet for turning said wheel, and a series of stroke-limiting stops controlled by said figure keys.

140. A series of figure keys, an adding wheel, a variable-stroke electro-magnet, means actuated by said electro-magnet for turning said wheel, a series of stops controlled by the several keys for variably limiting the stroke imparted by said electro-magnet, and a circuit-controller for said electro-magnet controlled by said keys.

141. Mechanism for producing or printing characters and finger operated keys for actuating the same, an adding device having an electro-motor for actuating it, the numeral k 's of said operating set of keys being each connected with and controlling said electro-motor and regulating its action upon said adding device in accordance with the ordinal value of the particular key operated, substantially as and for the purpose set forth.

142. The combination with a typewriting mechanism and an adding mechanism of means for automatically rendering the adding mechanism operative in connection with the typewriting mechanism at a predetermined portion of the line of writing and inoperative at all other portions; said means being adjustable to render said adding mechanism operative at different portions of the line of writing.

143. The combination with a typewriting mechanism and an adding mechanism, of means for automatically rendering the adding mechanism operative in connection with the typewriting mechanism at a predetermined portion of the line of writing and inoperative at all other portions; said means being adjustable to render said adding mechanism operative at either the first, the last or an intermediate portion of the line of writing.

144. The combination of adding wheels and printing means including keys, and connections between the keys and adding wheels whereby an adding wheel is adapted to be actuated when the connections are completed, said connections including a member movable to different positions for varying the connections after each movement so that the printing means are operable to print punctuation points at different intervals for each position of said member without operating the adding wheels.

145. In an adding machine, the combination of a series of adding wheels each provided with a pinion, a series of racks normally disengaged from said pinions, a single set of keys common to all of said wheels, means for moving said racks one after another into engagement with their respective pinions as the keys are operated one at a time, means for operating said racks through differential distances, and springs for returning said racks to normal position.

146. The combination with a typewriting mechanism including a series of letter types, a series of figure types, a series of manually operated keys therefor and a carriage connected to the keys for letter space movements, of a series of electrically operated adding wheels, means for automatically coupling said adding wheels to said figure keys whereby the adding wheels may be rotated at the depression of said figure keys and means controlled by said figure keys for variably limiting the extent of rotation of the wheels.

147. The combination with printing mechanism of manually operated keys for actuating said printing mechanism, a series of adding wheels, electrical devices controlled by said keys for rotating the wheels and key controlled devices for variably arresting the rotation of the wheels.

148. The combination of a series of figure keys, each operatively connected to a corresponding type and actuating it mechanically, a carriage connected to the keys for spacing movement, a series of adding wheels adapted to be operatively connected with any key so that the adding wheels may be rotated according to the position of the carriage, and means controlled by the figure keys for electrically operating the adding wheels.

149. The combination of a series of manually operated figure keys, printing devices mechanically connected with said keys, a series of adding wheels, electro-magnetic devices for rotating said wheels, devices controlled by the keys for limiting the movement of the wheel rotating devices, and means operating automatically at the actuation of any of the keys for successively connecting the wheels one at a time with their actuating mechanism.

150. The combination with a series of manually operated keys, a series of adding wheels, a single electro-magnet operatively connected to actuate each of said wheels, means operated by the figure keys for opening and closing the circuit of said magnet, means for variably limiting the movement of the electro-magnetic devices for actuating the wheels and means operating automatically at the actuation of any key to bring the electro-magnetic devices into relation with any one of the adding wheels.

151. The combination with a typewriter and the carriage thereof, of a typewriter key, a computing wheel, means including a rack bar for operating the computing wheel, and electro-magnetic connections through the carriage and controlled by the key for operating said bar.

152. The combination with a typewriter carriage and an operating key, of a computing wheel, means including a rack bar for operating said wheel, and electro-magnetic connections secured to said carriage and controlled by the key for operating said bar.

153. The combination with a sliding carriage and a key of a typewriter, of a computing wheel, means including a rack bar for operating the wheel, means for operating the rack bar, means for limiting the reciprocating motion of the rack bar, and electrical connections controlled by the key and secured to the carriage for actuating the rack bar and for actuating said limiting means.

154. The combination with a typewriter carriage, of a series of numbering keys, a series of count-wheels, denominationally arranged in train for units, tens, hundreds, etc., mechanical means for actuating said count-wheels, electrical connections with the carriage and controlled by the keys for actuating said count-wheel operating means, and selective mechanism for the count-wheel operating means controlled by the carriage.

155. The combination with an operating numbering key, of a series of count-wheels denominationally arranged in train for units, tens, hundreds, etc., a denomination pinion for each count-wheel, a reciprocating rack bar for each denomination pinion, said rack bars movable toward and from the respective pinions, electro-magnetic means controlled by said key for operating the several rack bars, and selective mechanism by which only the rack bar of the particular denomination will be operated at one actuation of said key.

156. The combination with an operating key, of a plurality of count-wheels denominationally arranged in train, denomination pinions corresponding thereto, rack bars engageable and disengageable with respective of said pinions, mechanism controlled by the key for reciprocating the rack bars, mechanism controlled by the key for engaging and disengaging the rack-bars with said pinions, and selective mechanism whereby only the rack-bar corresponding to the denomination of the number struck by the key will be engaged with the pinion.

157. The combination with an operating key, of a plurality of count-wheels denominationally arranged in train, denomination pinions corresponding thereto, rack-bars engageable and disengageable with respective of said pinions, mechanism controlled by the key for reciprocating the rack bars, mechanism controlled by the key for engaging and disengaging the rack bars with said pinions, selective mechanism whereby only the rack-bar corresponding to the denomination of the number struck by the key will be engaged with the pinion, and means for limiting the reciprocating movement of said rack bars.

158. The combination of an operating key, a count-wheel, a denomination pinion connected with said count-wheel, a rack bar engageable and disengageable with said pinion, electro-magnetic means and electrical connections controlled by the key for reciprocating said rack bar, electro-magnetic means and connections controlled by the key for engaging the rack bar with said pinion, and electro-magnetic means and connections controlled by said key for limiting the reciprocating movement of said rack bar.

159. The combination of a series of denomination pinions, count-wheels arranged denominationally in train and operative by said pinions, rack bars engageable and disengageable with said pinions, electrically-operated means for reciprocating the rack-bars, and electrically-operated means for independently engaging and disengaging the several rack bars with their respective pinions.

160. The combination of a series of denomination pinions, count-wheels arranged denominationally in train and operative by said pinions, rack bars engageable and disengageable with said pinions, electrically-operated means for reciprocating the rack bars, electrically-operated means for independently engaging and disengaging the several rack bars with their respective pinions, and electrically-operated selective mechanism for limiting the movement of said rack-bars.

161. The combination of a series of denomination pinions, count-wheels arranged denominationally in train and operative by said pinions, rack bars engageable and disengageable with said pinions, electrically-operated means for reciprocating the rack-bars, electrically-operated means for independently engaging and disengaging the several rack bars with their respective pinions, electrically-operated selective mechanism for limiting the movement of said rack bars, an operating key and electrical connections by which said several mechanisms are controlled from said key.

162. The combination with a computing device including a series of digit carriers and an actuator common to said carriers, of a traveling carriage, a series of keys, and means controlled by the movement of the carriage for operatively connecting the keys with the actuator.

163. The combination with a computing device and an actuator therefor, of numeral keys, a suitable connection between the keys and the actuator, and means for automatically moving an element of said connection to an inoperative position to permit the keys to be operated independently of the actuator.

164. The combination of the paper carriage, an adding mechanism keys therefor normally wholly out of coöperative relation therewith, and mechanism controlled by the movement of the paper carriage and operable to bring the keys and adding mechanism into coöperative relation with each other.

165. The combination of the paper carriage, an adding mechanism, keys therefor normally wholly out of coöperative relation therewith, means operated by the movement of the paper carriage to bring the keys and adding mechanism into coöperative relation with each other.

166. The combination of the paper carriage, an adding mechanism, keys therefor normally wholly out of coöperative relation therewith, and adjustable means operated by the movement of the paper carriage to bring the keys and adding mechanism into coöperative relation with each other at any desired point in the travel of the paper carriage.

167. The combination of the paper carriage, the regular type keys and printing devices of the typewriter, and an adding mechanism adapted to be controlled by certain of said keys, but normally wholly out of coöperative relation therewith.

168. The combination of the paper carriage, the regular type keys and printing devices of the typewriter, an adding mechanism adapted to be controlled by certain of said keys but normally wholly out of coöperative relation therewith, and means for automatically bringing such keys and the adding mechanism into coöperative relation with each other.

169. The combination of the paper carriage, the regular type keys and printing devices of the typewriter, an adding mechanism adapted to be controlled by certain of said keys but normally wholly out of coöperative relation therewith, and means operated by the movement of the paper carriage for bringing such keys and the adding mechanism into coöperative relation with each other.

170. The combination of the paper carriage, the regular type keys and printing devices of the typewriter, an adding mechanism adapted to be controlled by certain of said keys but normally wholly out of coöperative relation therewith, and adjustable means operated by the movement of the paper carriage for bringing such keys and adding mechanism into coöperative relation with each other at any desired point in the travel of the paper carriage.

171. The combination of the paper carriage, the operating keys and printing devices, the adding mechanism, an actuating device therefor adapted to be controlled by the keys but normally out of coöperative relation with the keys, and means for bringing said keys and actuating device into coöperative relation with each other.

172. The combination of the paper carriage, the operating keys and printing devices, the adding mechanism, an actuating device therefor adapted to be controlled by the keys but normally out of coöperative relation with the keys, and means for automatically bringing said keys and actuating device into coöperative relation with each other during the movement of the paper carriage.

173. The combination of the paper carriage, the operating keys and printing devices, the adding mechanism, an actuating device therefor adapted to be controlled by the keys but normally out of coöperative relation with the keys, and adjustable means for automatically bringing said keys and actuating device into coöperating relation with each other at any desired point in the movement of the paper carriage.

174. The combination of the paper carriage, the operating keys and printing devices, the adding mechanism, an actuating device therefor adapted to be controlled by the keys but normally out of coöperative relation with the keys, and means operated by the movement of the paper carriage for bringing said keys and actuating device into coöperative relation with each other.

175. The combination of the paper carriage, the operating keys and printing devices, the adding mechanism, an actuating device therefor adapted to be controlled by the keys but normally out of coöperative relation with the keys, and adjustable means operated by the movement of the paper carriage for bringing said keys and actuating device into coöperative relation with each other at any desired point in the movement of the paper carriage.

176. The combination of the paper carriage, the regular type keys and printing devices of the typewriter, the adding mechanism, an actuating device therefor adapted to be controlled by certain of said keys but normally out of coöperative relation with the keys, and means for bringing said keys and actuating device into coöperative relation with each other.

177. The combination of the paper carriage, the regular type keys and printing devices of the typewriter, the adding mechanism, an actuating device therefor adapted to be controlled by certain of said keys but normally out of coöperative relation with the keys, and means for automatically bringing said keys and actuating device into coöperative relation with each other during the movement of the paper carriage.

178. The combination of the paper carriage, the regular type keys and printing devices of the typewriter, the adding mechanism, an actuating device therefor adapted to be controlled by certain of said keys but normally out of coöperative relation with the keys, and adjustable means for automatically bringing said keys and actuating device into coöperative relation with each other at any desired point in the movement of the paper carriage.

179. The combination of the paper carriage, the regular type keys and printing devices of the typewriter, the adding mechanism, an actuating device therefor adapted to be controlled by certain of said keys but normally out of coöperative relation with the keys, and means operated by the movement of the paper carriage for bringing said keys and actuating device into coöperative relation with each other.

180. The combination of the paper carriage, the regular type keys and printing devices of the typewriter, the adding mechanism, an actuating device therefor adapted to be controlled by certain of said keys but normally out of coöperative relation with the keys, and adjustable means operated by the movement of the paper carriage for bringing said keys and actuating device into coöperative relation with each other at any desired point in the movement of the paper carriage.

181. The combination with a computing device including a series of denominational members and an actuator common to said members, of a traveling carriage, keys for causing the actuator to operate the computing device, and means for operatively connecting the keys with the actuator during a predetermined portion of the movement of the carriage.

182. The combination with a typewriter, of a computing device, a driving motor therefor, keys normally independent of the computing mechanism, and means operated by the typewriter carriage for bringing the computing mechanism under the control of the keys.

183. The combination with a typewriting machine, of a computing device, operating mechanism therefor including a motor, and means for automatically establishing a coöperative relation between the numeral keys of the typewriter and the operating mechanism of the computing device during the travel of the typewriter carriage.

184. The combination with a typewriting machine, of a computing device, operating mechanism therefor including a motor, and adjustable means for automatically causing a coöperating relation to be established between the numeral keys of the typewriter and the operating mechanism of the computing device at any one of several different points in the travel of the typewriter carriage.

185. The combination with the typewriter, of a computing device, operating machanism therefor, including a motor, and means adjustable on the carriage and operated by the movement of the latter to cause the operating mechanism of the computing device to be brought under the control of the numeral keys of the typewriter.

186. The combination with a typewriter, of a computing device normally out of coöperative relation with the typewriter keys, a driving motor for the computing device, and means for automatically effecting a coöperative relation between the computing device and the numeral keys of the typewriter, said means including coöperating devices mounted respectively on the frame of the typewriter and the typewriter carriage and one of said devices being adjustable on its support to determine that point in the advance of the typewriter carriage at which the coöperative relation will be established between the numeral keys and the computing device.

187. In a computing mechanism, the combination with a series of denominational members and a master actuator therefor, of a series of keys normally independent of the actuator, a reciprocatory carriage, and means operated by the forward movement of the carriage for establishing an operative relation between the keys and the actuator and operated by the retractile movement of the carriage to render the keys and actuator independent of each other.

188. The combination with a typewriter, of a computing device including a series of denominational members, a master actuator therefor, and mechanism for automatically establishing a coöperative relation between the actuator and the numeral keys of the typewriter during the advance of the typewriter carriage and for automatically rendering the keys and actuator independent before the next traverse of the typewriter carriage has commenced.

189. The combination with a traveling carriage, a computing device, an actuator therefor, and keys, of adjustable means for causing an operative relation to be automatically established between the actuator and keys at the proper point in the travel of the carriage.

190. In a writing and adding machine, in combination, a traveling carriage, printing mechanism, a plurality of separate sets of adding wheels, a single set of figure keys and connections therefrom adapted to operate said wheels, and means for effecting a relative adjustment between the carriage travel and said sets of adding wheels, whereby the said sets of wheels become operative at different selective portions of the carriage travel and thus enable columns to be produced at predetermined portions widthwise of the sheet being written upon.

191. In a writing and adding machine, in combination, a traveling carriage, printing mechanism, a plurality of separate sets of adding wheels, a single set of figure keys and connections therefrom adapted to operate said wheels, and means for varying the times at which said adding heads shall operate relative to the changing positions of the carriage in its travel.

192. In a combined typewriting and adding machine, the combination with a series of adding wheels rotatable one at a time, printing keys including figure and letter keys, and a step-by-step moving carriage of said typewriting mechanism, of means whereby the extent of rotation of said wheels is controllable by said figure keys, and means whereby the selection of the wheel to be rotated is controllable by the movement of said carriage, the last mentioned means being adjustable to bring said wheels automatically under the control of said keys at any predetermined position throughout the line of writing and the parts being arranged to permit the carriage to pass uninterruptedly in both directions through and beyond the position corresponding to the adding column.

193. The combination with a series of adding wheels and figure keys, and a carriage of a typewriting mechanism, of means whereby said wheels are controllable by said keys and carriage, said means including means adjustable parallel with the travel of said carriage for automatically establishing such control at any desired portion of the travel of said carriage, said means being arranged to permit the carriage to pass uninterruptedly in both directions through and beyond the position corresponding to the adding column.

194. The combination with a series of adding wheels and figure keys, and a carriage of a typewriting mechanism, of means whereby said wheels are controllable by said keys and carriage, said means including means adjustable parallel with the travel of said carriage for automatically establishing such control at any desired portion of the travel of the carriage and for automatically relinquishing such control at all other portions of the travel of the carriage.

195. The combination of a series of adding heads, a series of figure keys, and a typewriter carriage adapted to be controlled by the figure keys and the carriage of a typewriting mechanism, of adjustable means for varying the portions of the travel of the carriage of the typewriter at which the several adding heads shall operate.

196. The combination with typewriting mechanism including figure keys and a carriage, of a series of adding heads adapted to be controlled by said figure keys and the carriage, and adjustable means for varying the positions of the travel of the carriage of the typewriter at which the several adding heads shall operate, said adjustable means being adjustable with relation to the typewriter carriage and with relation to each other.

197. In a combined typewriting and adding machine including a typewriter carriage, figure keys and letter keys, and adding mechanism including number bearing dials, means for locating each of a plurality of adding columns at any desired portion of the line of writing, said means comprising the combination of a plurality of separate series of dial determining devices arranged to partake of the travel of the typewriter carriage, each of said series being independently adjustable with relation to said carriage and parallel with the travel of said carriage, and a relatively stationary device for coöperation with said dial determining devices one at a time.

198. In a combined typewriting and adding machine, the combination of a plurality of column locators each adjustable parallel with the line of writing and each provided with a series of denomination determining devices, and a coöperative part coöperative with said denomination determining devices one after another.

199. In a combined typewriting and adding machine, the combination with a typewriter paper carriage of a plurality of adding column locators each arranged to partake of the travel of said carriage, each adjustable parallel with the line of writing, and each provided with a series of denominational devices, and a relatively stationary device coöperative with said denominational devices one after another.

200. In a combined machine for writing words and numbers and for adding separately numbers written in a plurality of columns, means for locating said adding columns, said means comprising the combination of a bar parallel with the line of writing and arranged to travel in unison with the travel of said carriage, a plurality of column locators each adjustable along said bar and each provided with a series of denomination determining devices, and a relatively stationary device for coöperation with said denomination determining devices one after another as the carriage and said bar move step-by-step.

201. In a writing and adding machine, the combination of letter printing keys, figure printing keys, a typewriter carriage, a series of register wheels, and connections from said figure keys to said wheels, said connections including as coöperating parts thereof a device connected with all of said keys and a series of denominational devices, one for each of said wheels, one of said parts being connected to travel in unison with said carriage in both directions to and beyond the other of said parts, and one of said parts being adjustable to determine the location of the adding column with relation to the travel of said carriage.

202. In a writing and adding machine, the combination of letter printing keys, figure printing keys, a typewriter carriage, a plurality of series of register wheels, and connections from said figure keys to the wheels of each of said series, said connections including as parts thereof a plurality of series of denominational devices, one series for each of said series of wheels, and a coöperating device connected with all of said keys, one of said parts being connected to travel in unison with the travel of said carriage in both directions to and beyond the other of said parts, and each of said series of denominational devices being adjustable independently of the other to determine the location of an adding column with relation to the travel of said carriage.

203. In a combined typewriting and adding machine, comprising adding mechanism connected with a typewriting machine, the combination with the typewriter carriage, of means for locating a plurality of adding columns on the page of writing comprising a bar arranged parallel with the travel of said carriage, and a plurality of devices each carrying a series of denominational elements and mounted on said bar so as to be independently adjustable along said bar.

204. In a combined typewriting and adding machine, the combination with typewriting mechanism including a series of letter types, a series of figure types, keys therefor, and a carriage connected with said keys for letter space movements, of a series of adding wheels, power devices controlled by said carriage for determining which adding wheel shall be operated, and power devices controlled by said figure keys for determining the extent of operation imparted to the selected wheel.

205. In a combined typewriting and adding machine, the combination with typewriting mechanism including a series of letter types, a series of figure types, keys therefor, and a carriage connected with said keys for letter space movements, of a series of adding wheels, power devices controlled by said carriage for determining which adding wheel shall be operated, and power devices controlled by said figure keys for determining the extent of operation imparted to the selected wheel, said power devices being so related that those controlled by the carriage are brought into action only when a figure key is operated, and that those controlled by the figure keys are brought into action only when the carriage is in a predetermined position.

206. In calculating machines, the combination with a plurality of indicating disks, of a plurality of reciprocatory elements rotating the disks, power operated actuating and controlling mechanism for said elements, and manually operated controlling mechanism for said power operated mechanism.

207. In calculating machines, the combination with a plurality of indicating disks and wheels, of a plurality of reciprocatory racks rotating the wheels and disks, power operated actuating and controlling mechanism for said racks, and manually operated controlling mechanism for said power operated mechanism.

208. In calculating machines, the combination with indicating disks, of reciprocatory elements rotating the disks, power operated actuating and controlling mechanism for said elements, manually actuated levers, and means arranged for operation by the said levers and adapted to control the application and release of power to and from the said mechanism.

209. In a calculating machine, the combination with indicating disks, of power actuated reciprocatory elements for rotating the disks, stops for arresting the motion of the said elements in accordance with digits, and power operated mechanism for actuating said stops individually.

210. In a calculating machine, the combination of a single set of numeral keys for all denominations, a carriage, a series of indicating disks, a series of racks, one for each disk, said racks normally out of gear with said disks, a power-operated rack-operating device, a series of stops for arresting the motion of said racks, and power-operated means controlled by said keys and said carriage for bringing a selected one of said racks into gear with its disk, for moving one of said stops to operative position, and for bringing said power-operated rack-operating device into operation.

211. In a combined typewriting and calculating machine, the combination of typewriting mechanism including numeral keys and other keys and a carriage, a series of indicating disks, a series of racks, one for each disk, said racks normally out of gear with said disks, a power-operated rack-operating device, a series of stops for arresting the motion of said racks, and power-operated means controlled by said numeral keys and said carriage for bringing a selected one of said racks into gear with its disk, for moving one of said stops to operative position, and for bringing said power-operated rack-operating device into operation.

Signed at the borough of Manhattan, in the city of New York, in the county of New York, and State of New York, this 30th day of October A. D. 1899.

ALBERT H. ELLIS.

Witnesses:
ETHEL WELLS,
FLORENCE KEELING.